US012762653B2

(12) United States Patent
Zhao et al.

(10) Patent No.: US 12,762,653 B2
(45) Date of Patent: Oct. 13, 2026

(54) METHODS AND SYSTEMS FOR IMAGE PROCESSING

(71) Applicant: SHANGHAI UNITED IMAGING HEALTHCARE CO., LTD., Shanghai (CN)

(72) Inventors: Yizhang Zhao, Shanghai (CN); Xin Fan, Shanghai (CN); Boyu Li, Shanghai (CN); Xiaoyue Gu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 320 days.

(21) Appl. No.: 18/437,165

(22) Filed: Feb. 8, 2024

(65) Prior Publication Data

US 2024/0242312 A1 Jul. 18, 2024

Related U.S. Application Data

(63) Continuation of application No. PCT/CN2022/121238, filed on Sep. 26, 2022.

(30) Foreign Application Priority Data

Sep. 26, 2021 (CN) .......................... 202111131687.9
Dec. 29, 2021 (CN) .......................... 202111646363.9

(51) Int. Cl.
*G06K 9/00* (2022.01)
*G06T 5/50* (2006.01)
(Continued)

(52) U.S. Cl.
CPC .............. *G06T 5/50* (2013.01); *G06T 7/0012* (2013.01); *G06T 7/248* (2017.01); *G06T 7/337* (2017.01);
(Continued)

(58) Field of Classification Search
CPC ......... G06T 5/50; G06T 7/0012; G06T 7/248; G06T 7/337; G06T 12/10;
(Continued)

(56) References Cited

U.S. PATENT DOCUMENTS 9,773,308 B2 * 9/2017 Silbersweig ........... G16H 50/50
2010/0290683 A1 11/2010 Demeester et al.
(Continued)

FOREIGN PATENT DOCUMENTS

CN 103054605 A 4/2013
CN 103678504 A 3/2014
(Continued)

OTHER PUBLICATIONS

Li, Tiantian et al., Total-Body Parametric Reconstruction with Deep Learning-based Data-driven Motion Compensation, Journal of Nuclear Medicine, 2021, 3 pages.
(Continued)

*Primary Examiner* — Xin Jia
(74) *Attorney, Agent, or Firm* — METIS IP LLC

(57) ABSTRACT

The present disclosure relates to systems and methods for image processing. The method may include obtaining a first image and a second image of a first modality of a target object. The first image may correspond to a first state of the target object, and the second image may correspond to a second state of the target object. The method may include obtaining a third image of a second modality of the target object. The third image may correspond to the first state of the target object. The method may further include determining, based on the first image, the second image, the third image, and an image processing model, a fourth image of the second modality of the target object under the second state.

19 Claims, 12 Drawing Sheets

(51) Int. Cl.

| | |
|---|---|
| ***G06T 7/00*** | (2017.01) |
| ***G06T 7/246*** | (2017.01) |
| ***G06T 7/33*** | (2017.01) |
| ***G06T 12/10*** | (2026.01) |

(52) U.S. Cl.
CPC .... *G06T 12/10* (2026.01); *G06T 2207/10081* (2013.01); *G06T 2207/10088* (2013.01); *G06T 2207/10104* (2013.01); *G06T 2207/10108* (2013.01); *G06T 2207/20081* (2013.01); *G06T 2207/30048* (2013.01); *G06T 2207/30168* (2013.01)

(58) Field of Classification Search
CPC . G06T 2207/10081; G06T 2207/10088; G06T 2207/10104; G06T 2207/10108; G06T 2207/20081; G06T 2207/30048; G06T 2207/30168; G06T 7/30; G06T 2207/10076; G06T 7/20; G06T 7/0016
See application file for complete search history.

(56) References Cited

U.S. PATENT DOCUMENTS

| | | | |
|---|---|---|---|
| 2016/0071269 | A1 | 3/2016 | Tan et al. |
| 2018/0308264 | A1 | 10/2018 | Gu et al. |
| 2020/0126231 | A1 | 4/2020 | Hu et al. |
| 2020/0211236 | A1 | 7/2020 | Zhang et al. |
| 2021/0334598 | A1 | 10/2021 | Tan et al. |

FOREIGN PATENT DOCUMENTS

| | | | | | |
|---|---|---|---|---|---|
| CN | 105147312 | A | | 12/2015 | |
| CN | 106491151 | A | | 3/2017 | |
| CN | 107133996 | A | | 9/2017 | |
| CN | 107403457 | A | | 11/2017 | |
| CN | 108932741 | A | | 12/2018 | |
| CN | 110084868 | A | | 8/2019 | |
| CN | 110151210 | A | | 8/2019 | |
| CN | 110215226 | A | | 9/2019 | |
| CN | 110223247 | A | | 9/2019 | |
| CN | 111127441 | A | * | 5/2020 | ......... G06F 18/2135 |
| CN | 111544022 | A | | 8/2020 | |
| CN | 113539444 | A | | 10/2021 | |
| CN | 113744264 | A | | 12/2021 | |
| CN | 114299183 | A | | 4/2022 | |
| JP | 2018525748 | A | * | 9/2018 | ............. G16H 20/10 |
| WO | WO-2014115151 | A1 | * | 7/2014 | ............. G06T 12/00 |

OTHER PUBLICATIONS

Chen, Ying et al., Remote Sensing Image Registration Based on Secondary Gray Correction and Improved Space Transformation Network, China Sciencepaper, 15(8): 966-972, 2020.
International Search Report in PCT/CN2022/121238 mailed on Dec. 23, 2022, 4 pages.
Written Opinion in PCT/CN2022/121238 mailed on Dec. 23, 2022, 5 pages.
First Office Action in Chinese Application No. 202111131687.9 mailed on Jan. 4, 2024, 15 pages.

* cited by examiner

500

METHODS AND SYSTEMS FOR IMAGE PROCESSING

CROSS-REFERENCE TO RELATED APPLICATIONS

This application is a Continuation of International Application No. PCT/CN2022/121238, filed on Sep. 26, 2022, which claims priority of Chinese Patent Application No. 202111131687.9, filed on Sep. 26, 2021, and Chinese Patent Application No. 202111646363.9, filed on Dec. 29, 2021, the contents of each of which are hereby incorporated by reference.

TECHNICAL FIELD

This disclosure relates to image processing.

BACKGROUND

With the development of medical imaging technologies diagnosis can be performed on the basis of images of one or more modalities. Taking the PET-CT technology as an example, metabolic information of a subject may be detected through PET (Positron Emission Tomography), and anatomical information of the subject may be detected through CT (Computed Tomography). CT images and PET images of a subject, or a portion thereof, may be obtained at the same time so that the advantages of the CT images and the PET images may complement each other, thereby facilitating a physician to obtain precise anatomical localization and biological metabolic information and to make a comprehensive and accurate diagnosis or examination.

SUMMARY

According to an aspect of the present disclosure, a method for image processing is provided. The method may include obtaining a first image and a second image of a first modality of a target object. The first image may correspond to a first state of the target object, and the second image may correspond to a second state of the target object. The method may include obtaining a third image of a second modality of the target object. The third image may correspond to the first state of the target object. The method may further include determining, based on the first image, the second image, the third image, and an image processing model, a fourth image of the second modality of the target object under the second state.

In some embodiments, the method may further include determining a fifth image based on the fourth image and the second image.

In some embodiments, the first modality may include Positron Emission Computed Tomography (PET), and the second modality may include Computed Tomography (CT) or Magnetic Resonance Imaging (MRI).

In some embodiments, to determine, based on the first image, the second image, the third image, and an image processing model, a fourth image of the second modality of the target object under the second state, the method may include determining the fourth image by inputting the first image, the second image, and the third image into the image processing model.

In some embodiments, to determine, based on the first image, the second image, the third image, and an image processing model, a fourth image of the second modality of the target object under the second state, the method may include determining, based on the first image and the second image, motion information of the target object between the first state and the second state. The method may further include determining, based on the motion information, the third image, and the image processing model, the fourth image of the second modality of the target object under the second state.

In some embodiments, to determine, based on the first image and the second image, motion information of the target object between the first state and the second state, the method may include determining the motion information of the target object between the first state and the second state by inputting the first image and the second image into a second model. The method may further include determining, based on mutual information between the first image and the second image, the motion information of the target object between the first state and the second state.

In some embodiments, the image processing model may be a trained machine learning model.

In some embodiments, to obtain a first image of a first modality of a target object, the method may include obtaining multiple frames of images of the first modality of the target object. The method may also include determining a reference frame by processing the multiple frames of images and a reference image based on a first model. The reference image and the reference frame may correspond to the first state of the target object. The method may further include identifying, from the multiple frames of images and based on the reference frame, the first image.

In some embodiments, the reference frame may be an image that has a maximum degree of motion similarity with the reference image among the multiple frames of images.

In some embodiments, the method may further include determining the first image by performing an attenuation correction using the reference image.

Another aspect of the present disclosure provides a method for image processing. The method may include obtaining multiple frames of images of a first modality of a target object. The method may also include determining a reference frame by processing the multiple frames of images based on a reference image of a second modality and a first model. The first model may be configured to determine a degree of motion similarity between the reference image and each frame image of the multiple frames of images. The method may further include determining correction information of the multiple frames of images relative to the reference frame.

In some embodiments, the first model may be further configured to evaluate image quality of the multiple frames of images in terms of one or more image quality dimensions.

In some embodiments, the reference frame may be an image among the multiple frames of images that satisfies a preset condition. The preset condition may include a maximum degree of motion similarity, a maximum quality score in terms of the one or more image quality dimensions, or a maximum comprehensive score based on the degree of motion similarity and the quality score.

In some embodiments, the first model may be a trained machine learning model.

In some embodiments, the method may further include determining, based on the correction information and the multiple frames of images, multiple frames of registered images.

In some embodiments, to determine correction information of the multiple frames of images relative to the reference frame, the method may include determining a deformation field of each frame image in the multiple frames of images relative to the reference frame by inputting the each of the multiple frames of images and the reference frame into a second model, wherein the correction information includes the multiple deformation fields.

In some embodiments, the second model may be a trained machine learning model.

In some embodiments, the method may further include determining, based on each of the multiple deformation fields and the reference image, a corrected reference image. Each of the multiple corrected reference images may correspond to one of the multiple frames of registered images. The method may also include determining a corrected frame of image by correcting, based on a corresponding corrected reference image of the multiple corrected reference images, each of the multiple frames of registered images. The method may further include determining, based on the multiple corrected frames of images, a target frame of image.

In some embodiments, the first modality may include PET or Single-Photon Emission Computed Tomography (SPECT).

Another aspect of the present disclosure further provides a system for image processing. The system may include at least one storage device storing executable instructions and at least one processor in communication with the at least one storage device. When executing the executable instructions, the at least one processor may cause the system to perform the following operations. The system may obtain a first image and a second image of a first modality of a target object. The first image may correspond to a first state of the target object, and the second image may correspond to a second state of the target object. The system may obtain a third image of a second modality of the target object. The third image may correspond to the first state of the target object. The system may determine, based on the first image, the second image, the third image, and an image processing model, a fourth image of the second modality of the target object under the second state.

Another aspect of the present disclosure further provides a system for image processing. The system may include at least one storage device storing executable instructions and at least one processor in communication with the at least one storage device. When executing the executable instructions, the at least one processor may cause the system to perform the following operations. The system may obtain multiple frames of images of a first modality of a target object. The system may determine a reference frame by processing the multiple frames of images based on a reference image of a second modality and a first model. The first model may be configured to determine a degree of motion similarity between the reference image and each frame image of the multiple frames of images. The system may determine correction information of the multiple frames of images relative to the reference frame.

Another aspect of the present disclosure further provides a non-transitory computer readable medium. The non-transitory computer readable medium may include a set of instructions for image processing. When executed by at least one processor, the set of instructions may direct the at least one processor to effectuate a method. The method may include obtaining a first image and a second image of a first modality of a target object. The first image may correspond to a first state of the target object, and the second image may correspond to a second state of the target object. The method may include obtaining a third image of a second modality of the target object. The third image may correspond to the first state of the target object. The method may further include determining, based on the first image, the second image, the third image, and an image processing model, a fourth image of the second modality of the target object under the second state.

Another aspect of the present disclosure further provides a non-transitory computer readable medium. The non-transitory computer readable medium may include a set of instructions for image processing. When executed by at least one processor, the set of instructions may direct the at least one processor to effectuate a method. The method may include obtaining multiple frames of images of a first modality of a target object. The method may also include determining a reference frame by processing the multiple frames of images based on a reference image of a second modality and a first model. The first model may be configured to determine a degree of motion similarity between the reference image and each frame image of the multiple frames of images. The method may further include determining correction information of the multiple frames of images relative to the reference frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
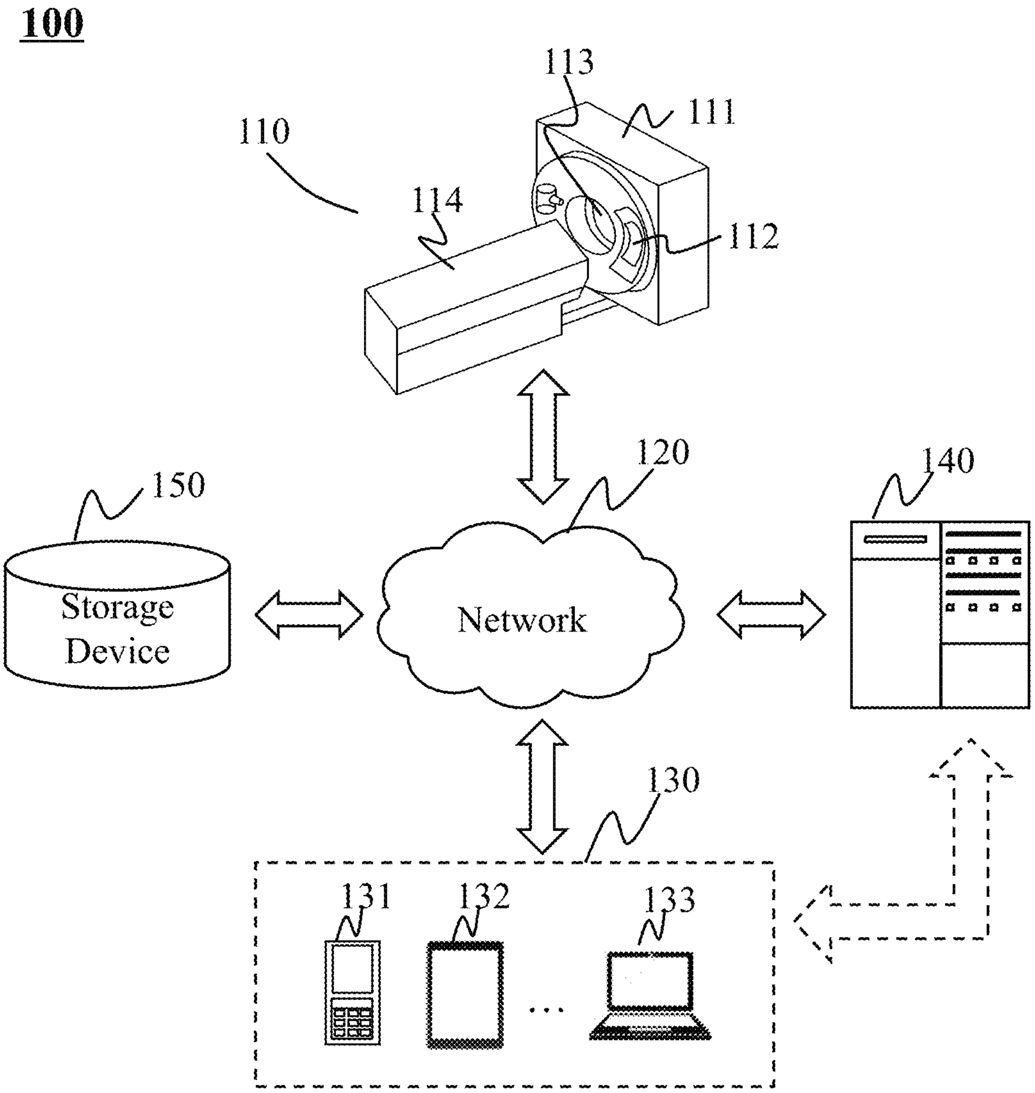
FIG. 1A is a schematic diagram illustrating an exemplary application scenario of an image processing system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

A plurality of medical imaging technologies including, e.g., Magnetic Resonance Imaging (MRI), Computed Tomography (CT), Positron Emission Tomography (PET), or the like, may be used alone or in combination in various scenarios including, for example, study of vital organs or tissue structures (e.g., heart, lungs, etc.), disease diagnosis and/or treatment, or the like. Multi-modality imaging may include, e.g., PET-CT, PET-MRI, or the like.

Taking PET-CT as an example, PET-CT imaging may be employed in cardiac imaging. Attenuation correction of PET images may be performed based on CT images, so that the attenuation-corrected PET images may be quantitatively analyzed and that the accuracy of diagnosis and/or treatment performed based on the attenuation-corrected PET images may be improved. A change in the position of an object during an imaging scan of the object may cause a shift in the position of the object represented in images acquired based on the imaging scan.

For example, two PET scans and one CT scan may be performed on the heart of an object during a cardiac imaging of the object, in which a first PET scan and the CT scan may be performed when the object is at a first state, and a second PET scan may be performed when the object is at a second state. A first PET image may be determined based on first PET data acquired during the first PET scan. A CT image may be determined based on CT data acquired during the CT scan. A second PET image may be determined based on second PET data acquired during the second PET scan. A movement of the object or another situation (e.g., the heart being not in different positions for two PET scans) during the cardiac imaging may cause a mismatch of the position of the heart represented in the images so determined, which may negatively affect the analysis of the images. Merely by way of example, if attenuation correction on the second PET image corresponding to the second PET scan that is performed when the object is at the second state is based on the CT image corresponding to the CT scan that is performed when the object is at the first state, the attenuation corrected second PET image may be inaccurate. Existing solutions may include performing an additional CT scan at a same or similar state of the object as the second PET scan, which may lead to an improved accuracy of the attenuation corrected second PET image, but at the same time increase the radiation dose the object receives during the cardiac imaging.

According to embodiments of the present disclosure, a CT image corresponding to the second state of the object as the second PET scan may be determined through a machine learning model based on the images that are obtained through the two PET scans performed at the first and the second states of the object and the one CT scan performed at the first state of the object. The CT image corresponding to the second state of the object so determined may facilitate a more accurate attenuation correction of the second PET image and obviate the need to perform an additional CT scan, thereby avoiding an exposure of the object to the radiation dose associated with such an additional CT scan and simplifying the cardiac imaging procedure. Further, according to some embodiments of the present disclosure, an operation complexity of image registration may be reduced, and the time needed for registration may be shorter than that of traditional non-rigid registration, thereby improving the accuracy of registration.

It should be noted that the embodiments mentioned above are merely for illustration purposes, which is not intended to limit the scope of the applicable scenario of the present disclosure. For example, the present disclosure may also be applied to PET-MRI imaging, or the like. As another example, the present disclosure may also be applied to other scenarios in addition to cardiac scan.

FIG. 1A is a schematic diagram illustrating an exemplary application scenario of an image processing system according to some embodiments of the present disclosure. As shown in FIG. 1A, an image processing system 100 may include an imaging device 110, a network 120, a terminal 130, a processing device 140, and a storage device 150.

The imaging device 110 may be configured to scan a target object to obtain scan data and an image of the target object. The imaging device 110 may be a medical imaging device, such as a Computed Tomography (CT) imaging device, a Positron Emission Computed Tomography (PET) imaging device, a Magnetic Resonance Imaging (MRI) imaging device, a Single-Photon Emission Computed Tomography (SPECT-CT) imaging device, a PET-MRI imaging device, or the like. In some embodiments, the imaging device 110 may include a gantry 111, a detector 112, a scanning region 113, and a scanning bed 114. The target object may be placed on the scanning bed 114 to be scanned. The gantry 111 may support the detector 112. In some embodiments, the detector 112 may include one or more detector modules. A detector module may be or include single-row detectors and/or multi-row detectors. The detector module(s) may include scintillation detectors (e.g., cesium iodide detectors) and other detectors. In some embodiments, the gantry 111 may be configured to rotate. For example, in a CT imaging device, the gantry 111 may rotate clockwise or counterclockwise around a gantry rotation axis. In some embodiments, the imaging device 110 may further include a radiation scanning source. The radiation scanning source may be configured to rotate with the gantry 111. The radiation scanning source may be configured to emit a radiation beam (e.g., X-rays) to the target object. Such a radiation beam may be attenuated by the target object, at least a portion of which may be detected by the detector 112, thereby generating an image signal. In some embodiments, a CT image of the object may provide anatomical information of the object and/or be used for attenuation correction of a PET image of the object.

The processing device 140 may process data and/or information transmitted from the imaging device 110, the terminal 130, and/or the storage device 150. For example, the processing device 140 may process image data that is generated by image signals detected by the detector 112 to obtain an image. In some embodiments, the processing device 140 may be a single server or a server group. The server group may be a centralized server group or a distributed server group. In some embodiments, the processing device 140 may be a local processing device or a remote processing device. For example, the processing device 140 may access information and/or data stored in the imaging device 110, the terminal 130, and/or the storage device 150. As another example, the processing device 140 may be implemented on a cloud platform. For example, the cloud platform may include private cloud, public cloud, hybrid cloud, community cloud, distributed cloud, inter-cloud, multiple clouds, or the like, or any combination thereof. In some embodiments, the processing device 140 may include one or more processors, and the processor(s) may be configured to perform the methods of the present disclosure.

The terminal 130 may include a mobile device 131, a personal digital assistant (PDA) 132, a laptop computer 133, or the like, or any combination thereof. In some embodiments, the terminal 130 may interact with other components of the image processing system 100 via the network 120. For example, the terminal 130 may transmit one or more control instructions to the imaging device 110 to cause the imaging device 110 to scan the target object based on the one or more control instructions. In some embodiments, the terminal 130 may be a part of the processing device 140. In some embodiments, the terminal 130 may be integrated with the processing device 140 to provide an operating console of the imaging device 110. For example, a user or an operator (e.g., a doctor) of the image processing system 100 may control operations of the imaging device 110 through the operating console, such as causing the imaging device 110 to scan a target object, or the like.

The storage device 150 may store data (e.g., scan data of the target object, a first image, a second image, etc.), instructions, and/or any other information. In some embodiments, the storage device 150 may store data obtained from the imaging device 110, the terminal 130, and/or the processing device 140. For example, the storage device 150 may store a first image and a second image of the target object, or the like, which are obtained from the imaging device 110. In some embodiments, the storage device 150 may store data and/or instructions that, when executed or used by the processing device 140, may cause one or more processes according to some embodiments of the present disclosure to be performed. In some embodiments, the storage device 150 may include a mass memory, a removable memory, a volatile read-write memory, a read-only memory (ROM), or the like, or any combination thereof. In some embodiments, the storage device 150 may be implemented on a cloud platform. For example, the cloud platform may include private cloud, public cloud, hybrid cloud, community cloud, distributed cloud, inter-cloud, multiple clouds, or the like, or any combination thereof.

In some embodiments, the storage device 150 may be operably connected to the network 120 to communicate with one or more components (e.g., the processing device 140, the terminal 130, etc.) of the image processing system 100. The one or more components of the image processing system 100 may retrieve data or instructions stored in the storage device 150 via the network 120. In some embodiments, the storage device 150 may be a part of the processing device 140. The storage device 150 may also be independent, which is operably connected to the processing device 140 directly or indirectly.

The network 120 may include any suitable networks capable of facilitating the exchange of information and/or data for the image processing system 100. In some embodiments, the one or more components (e.g., the imaging device 110, the terminal 130, the processing device 140, the storage device 150, etc.) of the image processing system 100 may exchange information and/or data with the one or more components of the image processing system 100. For example, the processing device 140 may obtain scan data from the imaging device 110 via the network 120. In some embodiments, the network 120 may include one or more network access points. For example, the network 120 may include wired and/or wireless network access points, such as base stations and/or internet exchange points. The one or more components of the image processing system 100 may be connected to the network 120 to exchange data and/or information.

Figure 1B:
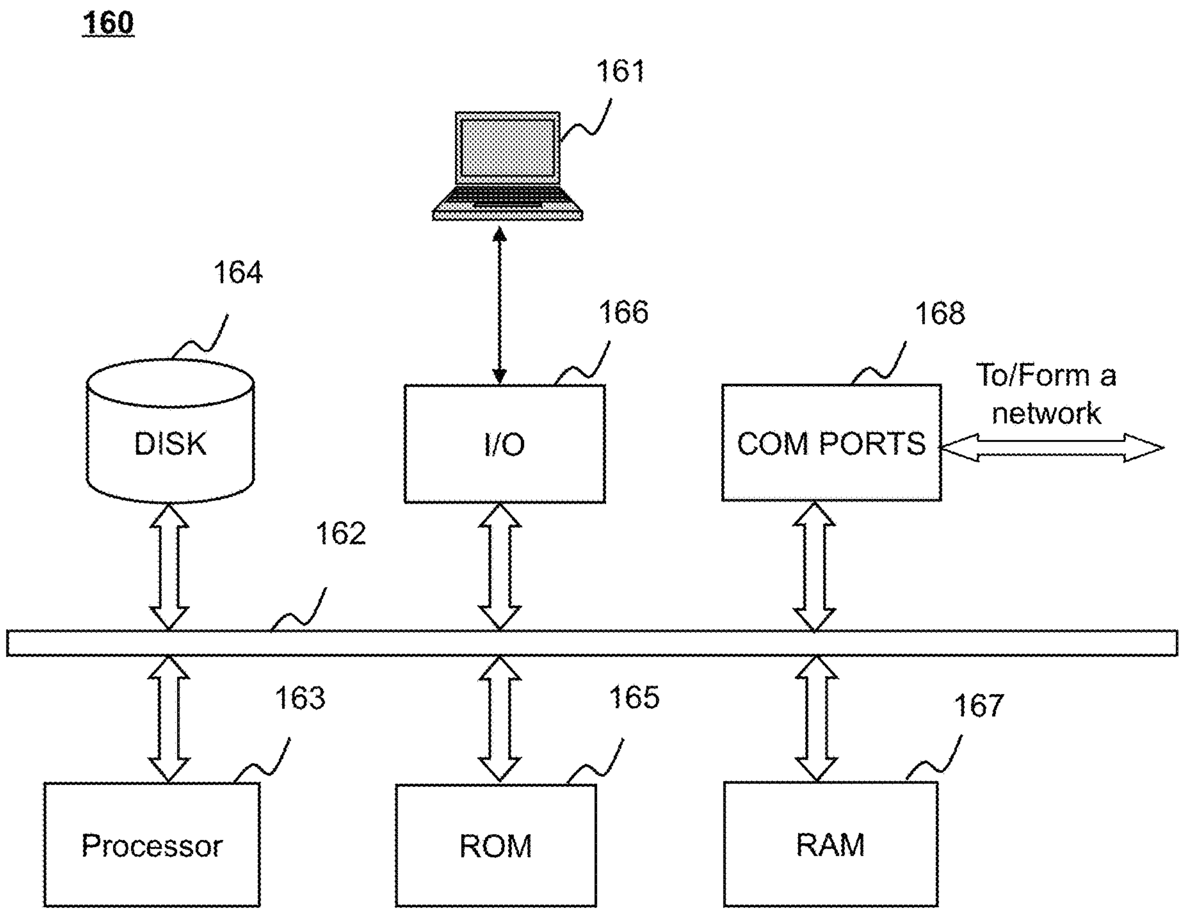
FIG. 1B is a schematic diagram illustrating exemplary hardware and/or software components of a computing device according to some embodiments of the present disclosure.

FIG. 1B is a schematic diagram illustrating exemplary hardware and/or software components of a computing device 160 according to some embodiments of the present disclosure. The computing device 160 may realize and/or implement a particular system (e.g., the processing device 140) disclosed in the present disclosure. A functional block diagram may be used to explain a hardware platform including a user interface of the system in the present disclosure. The computing device 160 may implement one or more components, modules, units, sub-units of the processing device 140. The computing device 160 may be a general-purpose computer or a special-purpose computer. For brevity, only one computing device is displayed in FIG. 1B. Computing function of the required information relating to data processing may be provided by a set of similar platforms in a distributed manner according to this disclosure, so as to disperse processing loads of the system.

As shown in FIG. 1B, the computing device 160 may include a user interface 161, an internal communication bus 162, a processor 163, a hard disk 164, a read only memory (ROM) 165, an input/output component 166, a random access memory (RAM) 167, and a communication port 168. The internal communication bus 162 may implement data communication among the components of the computing device 160. The processor 163 may execute a program instruction, and/or complete any function, component, module, unit, and sub-unit of the image processing system 100 described in the present disclosure. The instruction may indicate which one of a plurality of images received by the processing device 140 is to be processed. The processor 202 may include one or more processors. In some embodiments, the processor 202 may include one or more processors. In some embodiments, the processor 163 may include a microcontroller, a reduced instruction set computer (RISC), an application specific integrated circuit (ASIC), an application-specific instruction-set processor (ASIP), a central processing unit (CPU), a graphics processing unit (GPU), a physics processing unit (PPU), a microprocessor unit, a digital signal processor (DSP), a field programmable gate array (FPGA), or the other circuits or processors capable of executing the computer program instruction, or the like, or a combination thereof.

In some embodiments, the processor 163 may control the imaging device 110, the processing device 140, and/or the terminal 130. In some embodiments, the processor 163 may control the imaging device 110, the processing device 140, and the terminal 130 to receive information, or send information to the above system(s) and/or device(s). In some embodiments, the processor 163 may receive image information or information relating to the target object from the imaging device 110. The processor 163 may send the image information or the information relating to the target object to the processing device 140. The processor 163 may receive processed data or images from the processing device 140. The processor 163 may send the processed data or image to the terminal 130. In some embodiments, the processor 163 may execute programs, algorithms, software, or the like. In some embodiments, the processor 163 may include one or more interfaces. The interface(s) may include an interface between the imaging device 110, the processing device 140, the terminal 130, and/or the other modules or units of the image processing system 100.

In some embodiments, the processor 163 may execute a command obtained from the terminal 130. The processor 163 may control imaging device 110 and/or processing device 140 by processing and/or converting the command. For example, the processor 163 may process user input information by the terminal 130, and convert the information to one or more corresponding commands. The command may be scan time, location information of the target object, a rotation speed of the gantry of the imaging device 110, a scan parameter, a data processing parameter, or the like, or a combination thereof. The processor 163 may control the processing device 140 to select different algorithms, so as to process and/or analyze the image data. In some embodiments, the processor 163 may be integrated in an external computing device which is used for controlling the imaging device 110, the processing device 140, and/or the terminal 130, or the like. In some embodiments, the processor 163 may include one or more nodes. Each node may execute a process. A node may be a single chip microcomputer or an independent computer, or may be one of a plurality of virtual nodes of a computer.

In some embodiments, the computing device 160 may include one or more storage devices in one or more forms (e.g., the hard disk 164, the read only memory (ROM) 165, the random access memory (RAM) 167, a cloud memory (not shown)) used for storing data, programs, and/or algorithms, or the like. The storage device may store various data files used in the processing process and/or communication, and/or program instructions executed by the processor 163. The storage device may be located inside or outside of the image processing system 100 (e.g., external storage devices, the cloud memory, or the like, connected via the network 120). The storage device (e.g., the hard disk 164, the read only memory (ROM) 165, the random access memory (RAM) 167, the cloud memory (not shown)) may store the information obtained from the imaging device 110, the processing device 140, and/or the terminal 130. The information may include image information, programs, software, algorithms, data, texts, numbers, images, audios, etc. that may be used in the data processing process, or the like, or a combination thereof.

The hard disk 164 may be a device which stores information using magnetic energy. In some embodiments, the hard disk 164 may be a floppy disk, a magnetic tape, a magnetic core memory, a bubble memory, a USB flash disk, a flash memory, etc. which stores information using the magnetic energy. The read only memory (ROM) 165, and/or the random access memory (RAM) 167 may store information using electric energy. The read only memory (ROM) 165 may include an optical disc drive, a hard disk, a magnetic tape, a non-volatile random access memory (NVRAM), a non-volatile SRAM, a flash memory, an electrically-erasable programmable read-only memory, an erasable programmable read-only memory, a programmable read-only memory, or the like, or a combination thereof. The random access memory (RAM) 167 may include a dynamic random access memory (DRAM), a static random access memory (SRAM), a thyristor random access memory (T-RAM), a zero-capacitor random access memory (Z-RAM), or the like, and a combination thereof.

In some embodiments, the storage device may be a device that stores information in an optical way, such as CD, DVD, etc. In some embodiments, the storage device may be a device that stores the information in a magneto-optic way, such as a magneto optical disk. An access mode of the storage device may include random storage, series access storage, read-only storage, or the like, or a combination thereof. The above storage device may be a non-permanent memory storage device, or a permanent memory storage device. It should be noted that the above description of the above storage device is merely provided for the purposes of illustration, and not intended to limit the scope of the present disclosure. The above storage devices may be local or remote. The above storage devices may be centralized or distributed. For example, the above storage devices may be located in a cloud server (not shown).

The input/output component (also referred to as I/O) 166 may support the input and/or output (e.g., receiving, sending, displaying, printing of information, etc.) of data stream (s) between the computing device 160 and one or more components of the image processing system 100 (e.g., the imaging device 110, the terminal 130, or the like). In some embodiments, the input/output component 166 may include a keyboard, a touch device, a mouse, a mechanical analogy device, a wearable device (e.g., a three-dimensional glass, a mechanical glove, or the like), a virtual reality device, an audio input device, an image input device, a remote control device, or the like, or a combination thereof. The output information may be sent or may not be sent to the user. The output information that is not sent may be stored in the hard disk 164, the read only memory (ROM) 165, the random access memory (RAM) 167, or may be deleted. In some embodiments, the user may input some original parameters or set an initialization condition corresponding to the data processing by the input/output component 166. In some embodiments, information may be input from an external data source (e.g., the floppy disk, the hard disk, a compact disk, a memory chip, a wired terminal, a wireless terminal, or the like, or a combination thereof). The input/output component 166 may receive information from another module or unit of the image processing system 100, or may send information to another module or unit of the system.

The communication port 168 may implement the data communication between the computing device 160 and one or more parts of the image processing system 100 (e.g., the imaging device 110, the terminal 130, or the like). The computer may send and/or receive the information (and/or data) from the network 120 by the communication port 168. The form of the information output by the image processing system 100 may include a number, a character, an instruction, a sound, an image, a system, software, a program, or the like, or a combination thereof.

The user interface 161 may display information generated during the data processing process, or the data processing result (e.g., an image splicing result, an image segmentation result, or the like, or a combination thereof). The user interface 161 may implement interaction between the user and the data processing process, for example, a control of the starting or stopping of the processing process by the user, the selecting or modifying of an operational parameter, the selecting or modifying of an algorithm, the modifying of a program, the exiting of the system, the maintaining of the system, the upgrading of the system, the system updating, or the like.

It should be noted that the storage device (the hard disk 164, the read only memory (ROM) 165, the random access memory (RAM) 167, a cloud memory, or the like) and/or the processor 163 may actually exist in the system. In some embodiments, the corresponding functions of the storage device and/or the processor 163 may be implemented by a cloud computing platform. The cloud computing platform may include a storage-type cloud platform for storing data, a computing-type cloud platform for processing data, and a synthetic cloud platform for the data storage and processing. The cloud platform used by the image processing system 100 may be a public cloud, a private cloud, a community cloud, a hybrid cloud, or the like. For example, according to the practical needs, a portion of the information received by the image processing system 100 may be processed and/or stored by the cloud platform, while the other portion(s) of the information may be processed and/or stored by a local processing device and/or storage device.

Figure 1C:
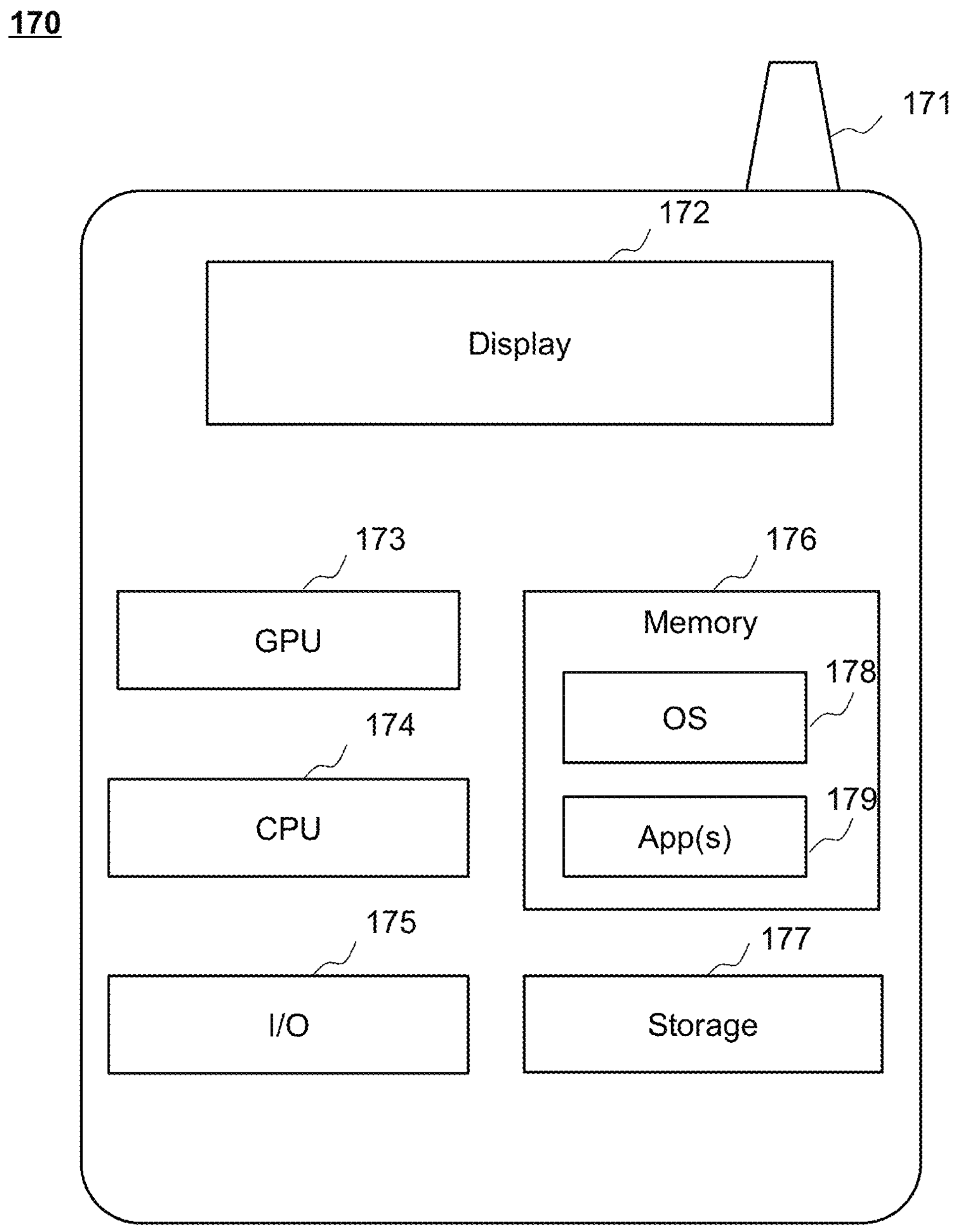
FIG. 1C is a schematic diagram illustrating exemplary hardware and/or software components of a mobile device according to some embodiments of the present disclosure.

In some embodiments, the image processing system 100 may have one or more computing devices 160. The plurality of computing devices 160 may realize and/or implement the same or different functions. For example, a first computing device may control the imaging device 110 to image, and obtain the image data. As another example, a second computing device may acquire the image data from the first computing device or a storage device, process the image data, and store the processing result. As a further example, a third computing device may acquire the processing result from the second computing device, display the result in a visualization manner so as to display it when the user (e.g., the doctor) views the image. FIG. 1C is a schematic diagram illustrating exemplary hardware and/or software components of a mobile device according to some embodiments of the present disclosure. The mobile device 170 may realize and/or implement a particular system disclosed in the present disclosure. In some embodiments, the terminal 130 may be a mobile device 170 for displaying information relating to user interaction. The mobile device 170 may have various forms, including a smartphone, a tablet, a music player, a portable game console, a global positioning system (GPS) receiver, a wearable computing device (e.g., glasses, a watch), or the like, or any combination thereof. In some embodiments, the mobile device 170 may include one or more antennae 171 (e.g., a wireless communication unit), a display module 172, a graphics processing unit (GPU) 173, a central processing unit (CPU) 174, an input/output module 175, a memory 176, and a storage 177. Although the antenna 171 in FIG. 1C is displayed outside the mobile device 170, the antenna 171 may also be provided within the mobile device 170. In some embodiments, the mobile device 170 may also include any other suitable component, such as a system bus controller (not shown). As shown in FIG. 1C, a mobile operating system 178 (such as iOS, Android, Windows Phone, etc.), and/or one or more applications 179 may be loaded from the storage 177 into the memory 176 and executed by the central processing unit (CPU) 174. The applications 179 may include a browser and/or other mobile application suitable for receiving and/or processing information relating to the image on the mobile device 170. The input/output module 175 may provide an interactive function of information relating to the image data. The input/output module 175 may implement interaction of information between the mobile device 170 and the processing device 140, and/or other components of the image processing system 100, for example, transmit information via the network 120.

In order to implement different modules, units as well as functions thereof as described above, the computing device 160 and/or the mobile device 170 may act as a hardware platform of one or more components described above (e.g., the processing device 140, the terminal 130, and/or other components of the image processing system 100 described in FIG. 1A). Hardware elements, operating systems, and programming languages of such computers are common in nature and it may be assumed that those skilled in the art will be sufficiently familiar with these techniques and will be able to use the techniques described herein to provide the information required for data processing. A computer that contains user interface elements can be used as a personal computer (PC) or other type of a workstation or a terminal device, and can be used as a server after being properly programmed. It may be understood that those skilled in the art will be familiar with such structures, programs, as well as general operations of such computer equipment, and therefore all accompanying drawings do not require additional explanation.

Figure 2:
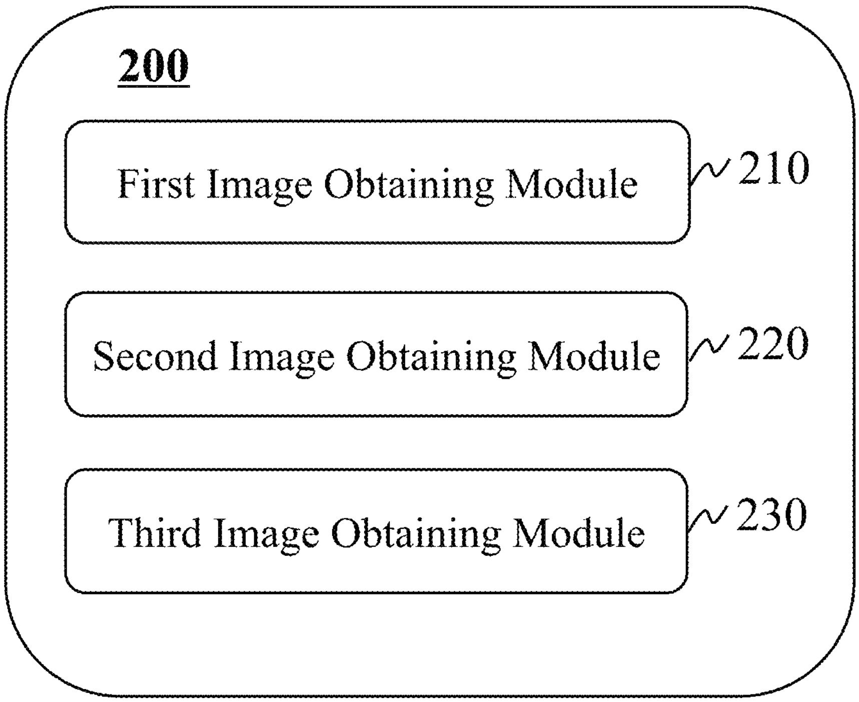
FIG. 2 is a schematic diagram illustrating exemplary modules of an image processing system according to some embodiments of the present disclosure.

FIG. 2 is a schematic diagram illustrating exemplary modules of an image processing system according to some embodiments of the present disclosure. As shown in FIG. 2, an image processing system 200 may include a first image obtaining module 210, a second image obtaining module 220, and a third image obtaining module 230. In some embodiments, the modules illustrated in FIG. 2 may be implemented on a computing device (e.g., the processing device 140).

The first image obtaining module 210 may be configured to obtain an image of a first modality. For instance, the first image obtaining module 210 may be configured to obtain a first image and a second image of a first modality of a target object. The first image may correspond to a first state of the target object. The second image may correspond to a second state of the target object. The first image obtaining module 210 may be configured to obtain an image from an imaging device (e.g., the imaging device 110), or from a storage device (e.g., the storage device 150, a storage device external to and in communication with the image processing system 100).

The second image obtaining module 220 may be configured to obtain images of a second modality. For instance, the second image obtaining module 220 may obtain a third image of a second modality of the target object. The third image may correspond to the first state of the target object. The second image obtaining module 220 may be configured to obtain an image from an imaging device (e.g., the imaging device 110), or from a storage device (e.g., the storage device 150, a storage device external to and in communication with the image processing system 100).

The third image obtaining module 230 may be configured to determine, based on the first image, the second image, the third image, and an image processing model, a fourth image of the second modality of the target object under the second state.

Merely by way of example, the first modality may be PET; the second modality may be CT or MRI. The target object may include a patient, or a portion thereof (e.g., the heart and/or a lung of the patient). The first state and the second state may be different. More details about the modules of the image processing system 200 may refer to the descriptions of FIG. 3 to FIG. 5.

It should be understood that the system and the modules shown in FIG. 2 may be implemented in various manners. For example, in some embodiments, the system and the modules may be implemented in hardware, software, or a combination of software and hardware. The hardware may be implemented through a dedicated logic. The software may be stored in the memory, which is executed through suitable instructions. For example, the software may be executed by a microprocessor or dedicated hardware. The skilled in the art may understand that the methods and the systems mentioned above may be achieved through computer-executable instructions and/or control codes included in the processor. For example, the computer-executable instructions and/or control codes may be stored in a non-transitory computer-readable medium including, e.g., a disk, a CD or DVD-ROM medium, a programmable memory such as read-only memory (firmware), or a data medium such as an optical or an electronic signal carrier. The systems and the modules of the present disclosure may be achieved not only through a large-scale integrated circuit or gate array, a logic chip, a semiconductor such as a transistor, a field programmable gate array, and a hardware circuit of a programmable hardware device such as a programmable logic device, but also through various types of processors. The systems and the modules of the present disclosure may also be achieved through a combination of the hardware circuit and software (e.g., firmware) mentioned above.

Figure 3:
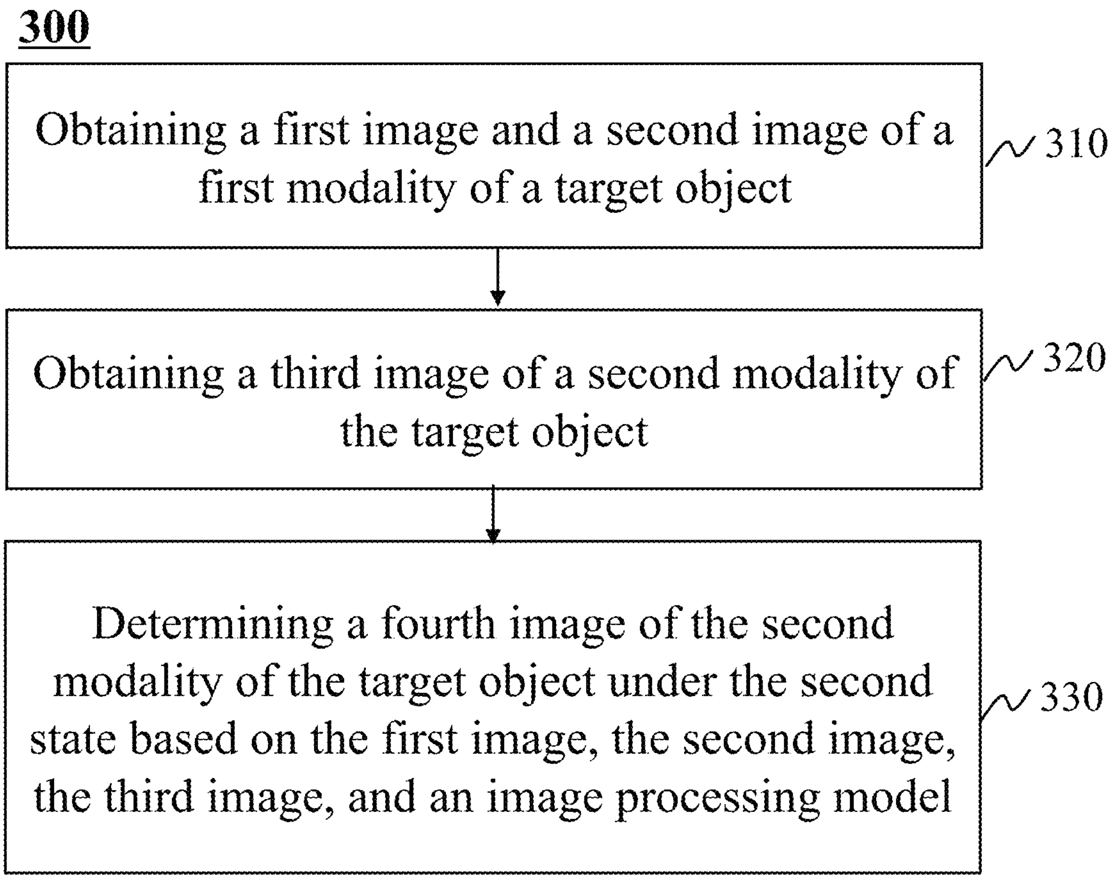
FIG. 3 is an exemplary flowchart illustrating an image processing for a cardiac scan according to some embodiments of the present disclosure.

FIG. 3 is an exemplary flowchart illustrating an image processing for a cardiac scan according to some embodiments of the present disclosure. As shown in FIG. 3, a process 300 may be performed by a processing device, such as the processing device 140. For example, the process 300 may be stored in a form of programs or instructions in a storage device (e.g., a built-in storage unit of the processing device or an external storage device).

In operation 310, a first image and a second image of a first modality of a target object may be obtained. In some embodiments, the operation 310 may be performed by the processing device 140, e.g., the first image obtaining module 210.

The target object may include a patient or another medical or experimental object (e.g., a mouse, or another animal), or the like. The target object may be a part of the patient, or another medical experimental object. For instance, the target object may include an organ and/or tissue of a patient including, e.g., the heart or a lung of the patient, or the like. In some embodiments, the target object may also include a non-biological object such as a phantom, a man-made object, or the like.

The first modality may be an imaging modality corresponding to the imaging of the target object. For example, the first modality may be PET.

In some embodiments, the first image may correspond to a first state of the target object, and the second image may correspond to a second state of the target object.

The first image may be an image reconstructed based on first data. The first data may be data obtained by scanning the target object under the first state using an imaging device in the first modality. For example, the first data may be PET scan data obtained by scanning the target object under the first state using the imaging device of the first modality; the first image may be a PET image determined by image reconstruction based on the first data.

The second image may be an image reconstructed based on second data. The second data may be data obtained by scanning the target object under the second state using an imaging device in the first modality. For example, the second data may be PET image data obtained by scanning the target object under the second state using the imaging device of the second modality; the second image may be a PET image determined by image reconstruction based on the second data.

As for the cardiac scan, one of the first state or the second state may be a stress or stimulated state, and the other may be a resting state. In some embodiments, under the stress or stimulated state, the target object (e.g., the heart of a patient or another type of animal) may be stimulated by way of, e.g., pharmacological stimulation, exercise, etc. Under the resting state, the target object may be unstimulated.

In some embodiments, an image reconstruction algorithm for determining the first image and/or the second image may include filter back projection, iterative reconstruction, or the like. The first image and the second image may be determined based on a same image reconstruction algorithm or different image reconstruction algorithms.

In some embodiments, the processing device may cause an imaging device of the first modality (e.g., a PET imaging device) to scan the target object and obtain the first image and the second image. For example, the imaging device of the first modality may scan the target object under the first state to obtain image data that can be used to generate the first image, and scan the target object under the second state to obtain second image data that can be used to generate the second image.

In some embodiments, the processing device may retrieve the first image and the second image from a storage device (e.g., the storage device 150, a storage device external to and in communication with the image processing system 100) or a database.

In some embodiments, the processing device may obtain the first image of the first modality by selecting, from multiple frames of images of the first modality, a frame of image (or referred to as an image frame) that satisfies a condition with respect to a reference image. Exemplary operations are provided below for illustration purposes.

The processing device may obtain multiple frames of images of the first modality of the target object. For instance, the multiple frames of images may be multiple frames of PET images obtained through scanning the target object by an imaging device of the first modality. In some embodiments, the multiple frames of images are determined by way of, e.g., image reconstruction, pre-processing, and/or post-processing. In some embodiments, an image of the multiple frames of images may be an image frame generated based on scan data of the target object that is acquired at a time point or multiple corresponding time points when the status (e.g., motion status (or motion phase), a resting or stress (or stimulated) state) of the target object is the same or similar. In some embodiments, the multiple frames of images may be acquired when the target object is under the first state.

The processing device may determine a reference frame by processing the multiple frames of images based on a first model. In some embodiments, the reference frame may be identified by comparing, using the first model, the multiple frames of images with a reference image of the target object. The reference image and the reference frame may correspond to a same or similar status (e.g., a resting or stress (or stimulated) state) of the target object. For example, the reference image and the reference frame may be obtained by scanning the target object under the first state.

The reference image may be an image of a second modality different from the first modality. For example, the reference image may be a CT image. In some embodiments, the reference image may include a CT image corresponding to (e.g., including a representation of the target object under) the first state on the basis of which an attenuation correction of the first image is performed as described in 330.

The reference frame may be used as a reference for subsequent image processing (e.g., motion correction, image registration, etc.). In some embodiments, the reference frame may be an image that has a maximum degree of motion similarity with the reference image among the multiple frames of images.

In some embodiments, after the reference frame is determined, the processing device may perform image registration on one of the multiple frames of images of the first modality excluding the reference frame based on the reference frame, and determine the registered frame of image as the first image.

In some embodiments, after the reference frame is determined, the processing device may perform image registration on the multiple frames of images of the first modality excluding the reference frame based on the reference frame, and select one of the multiple frames of registered images as the first image.

The first model may be a trained machine learning model. More descriptions about the first model may be found elsewhere in the present disclosure. See, e.g., FIG. 6 and FIG. 7, and the descriptions thereof.

In some embodiments, the processing device may retrieve the reference image from a storage device or database, or causing an imaging device of the second modality to scan the target object.

In some embodiments, the processing device may input the multiple frames of images and the reference image into the first model, and the first model may identify, from the multiple frames of images, the reference frame. The processing device may designate the reference frame as the first image. For example, the processing device may perform motion correction on the multiple frames of images based on the reference frame, and determine the first image based on the motion corrected images. For example, the processing device may randomly select one of the motion corrected images as the first image. As another example, the processing device may determine an image that has a best image quality as the first image among the multiple frames of motion corrected images. More descriptions of the process for reference frame selection may be found elsewhere in the present disclosure. See, e.g., FIGS. 6-9 and relevant description thereof.

In some embodiments, the processing device may determine the first image by performing an attenuation correction based on the reference image. For example, the processing device may perform the attenuation correction on a preliminary first image based on the reference image, and determine the attenuation corrected image as the first image. In some embodiments, the preliminary first image may be a preliminary PET image determined based on the first data. The preliminary first image and the first image may be different at least in that the preliminary first image is not attenuation corrected. For example, the preliminary PET image may be obtained by performing an image reconstruction, but without attenuation correction, on the first data that is obtained by scanning the target object using the imaging device of the first modality. In some embodiments, the preliminary first image may also include the first data corresponding to the first image.

In operation 320, a third image of the second modality of the target object may be obtained. In some embodiments, the operation 320 may be performed by the processing device 140, e.g., the second image obtaining module 220.

The second modality may be another imaging modality different from the first modality. For example, the first modality may be PET, and the second modality may be CT, MRI, or the like.

The third image may be an image reconstructed based on third data. The third data may be data obtained by scanning the target object under the first state using an imaging device of the second modality. The third image may be an image reconstructed based on the third data. For example, the third image may be a CT image, an MRI image, or the like.

In some embodiments, the third image may correspond to the first state of the target object. For example, the third image may correspond to the target object under the resting state. In some embodiments, the third image may be a CT image obtained by scanning the target object under the resting state using the imaging device of the second modality (e.g., a CT imaging device). In some embodiments, the third image may be used as the reference image described in 310.

In some embodiments, the processing device may obtain the third image by causing the imaging device (e.g., a CT imaging device or an MRI imaging device) of the second modality to scan the target object under the first state.

In some embodiments, the processing device may retrieve the third image from a storage device (e.g., the storage device 150, a storage device external to and in communication with the image processing system 100) or database.

In operation 330, a fourth image of the second modality of the target object under the second state may be determined based on the first image, the second image, the third image, and an image processing model. In some embodiments, the operation 330 may be performed by the processing device 140, e.g., the third image obtaining module 230.

The fourth image may be an image of the second modality including a representation of the target object under the second state. The fourth image may be a stimulated image. Compared with scanning the target object using the imaging device of the second modality, the fourth image may be an image obtained without an actual scanning of the target object, thereby reducing the radiation dose to the target object and/or simplifying the cardiac scan process.

In some embodiments, the processing device may determine motion information between the first state and the second state of the target object based on the first image and the second image. For example, the processing device may determine the motion information between the first state and the second state of the target object by inputting the first image and the second image into the image processing model. As another example, the processing device may determine the motion information between the first state and the second state of the target object by determining mutual information between the first image and the second image. More description regarding the determination of the mutual information may be found elsewhere in the present disclosure. See, e.g., FIG. 8 and relevant description thereof. As a further example, the processing device may determine the motion information between the first state and the second state of the target object using a second model. The second model may be a machine learning model. In some embodiments, the second model and the image processing model may be two separate models. More description regarding the determination of the motion information may be found elsewhere in the present disclosure. See, FIG. 4 and the description thereof.

In some embodiments, the fourth image of the second modality of the target object under the second state may be determined by performing a motion correction on the third image. The motion correction may be performed based on the motion information between the first state and the second state of the target object. For instance, the processing device may determine the fourth image of the second modality of the target object under the second state by inputting the motion information and the third image into the image processing model. Accordingly, the fourth image and the second image may both include a representation of the target object under the second state, thereby providing a satisfactory alignment of the representations of the target object in the fourth image and the second image.

In some embodiments, the image processing model may include a neural network model, a deep learning model, or the like. The image processing model may be obtained by training a plurality of training samples and a plurality of labels. More details about the training of the image processing model may be found elsewhere in the present disclosure. See, e.g., FIG. 5 and the description thereof.

In some embodiments, the processing device may obtain a fifth image based on the fourth image. The fifth image may be an image obtained by performing, based on the fourth image, an attenuation correction on the second image or the second data on the basis of which the second image is determined. For example, the attenuation correction may be performed on the second data to generate attenuation corrected second data; the fifth image may be generated by image reconstruction based on the attenuation corrected second data. As another example, the second image may be generated by image reconstruction based on the second data; the attenuation correction may be performed on the second image to generate attenuation corrected fifth image.

In some embodiments, the processing device may obtain the fifth image by inputting the fourth image and the second image into a trained correction model. The correction model may be obtained based on a plurality of training sample sets. A training sample set may include a sample fourth image and a sample second image as input of a correction model to be trained (an initial correction model or an intermediate correction model that is partially trained), and a corresponding sample fifth image as a label. A label of a training sample set may be obtained by image reconstruction based on sample second data on the basis of which the sample second image is determined by way of, e.g., image reconstruction. The training of the correction model may be an iterative process including, e.g., a gradient descent algorithm, or the like, which is not limited herein.

The fifth image obtained by performing, based on the fourth image, the attenuation correction on the second image may allow more accurate quantification thereof. For example, during a cardiac scan, if there are ribs around and/or in the vicinity of (e.g., above, below) the heart, radiation emitted by the tracer in the heart may be blocked and/or scattered by the ribs during the scan, and the tracer concentration reflected in the second image may be lower than the actual tracer concentration. Accordingly, an attenuation correction may need to be performed on the second image. CT images may include information regarding attenuation and/or scattering that occurs due to the existence of an organ and/or tissue around and/or in a vicinity of the target object, e.g., the existence of the ribs around and/or in a vicinity of the heart. The tracer concentration that is affected by the ribs may be compensated by way of attenuation correction. A satisfactory attenuation correction of the second image based on, e.g., a CT image (e.g., the fourth image) may depend on a satisfactory alignment of the anatomical structures in the CT image and the PET image. Accordingly, the fourth image generated by the image processing model based on the first image, the second image, and the third image may include a representation of the target object under the second state as the second image, thereby providing a satisfactory alignment of the representations of the target object in the fourth image and the second image, which in turn may facilitate a satisfactory attenuation correction of the second image. In the context of cardiac imaging, the PET images of the target object, the heart of a patient, so acquired may allow a more accurate examination and/or evaluation of the condition of the heart. At the same time, no additional CT scan is needed to generate the fourth image, thereby reducing the radiation exposure of the target object and/or simplifying the cardiac scan.

Figure 4:
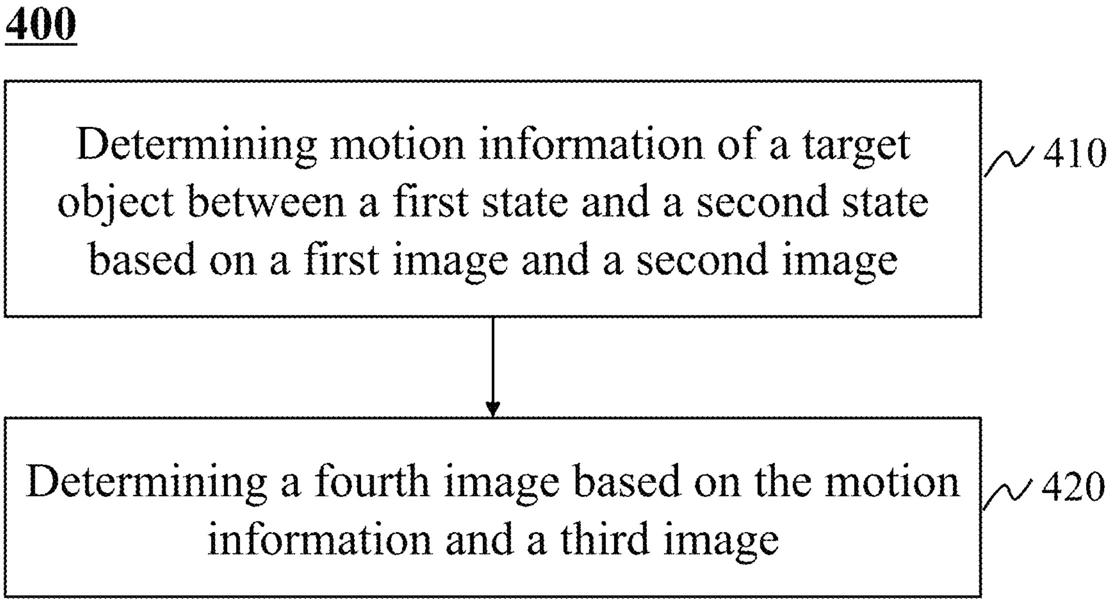
FIG. 4 is an exemplary flowchart illustrating a process for determining a fourth image according to some embodiments of the present disclosure.

FIG. 4 is an exemplary flow chart illustrating a process for determining a fourth image according to some embodiments of the present disclosure. In some embodiments, a process 400 may be performed by a processing device, such as the processing device 140. For example, the process 400 may be stored in a form of programs or instructions in a storage device (e.g., a built-in storage unit of the processing device or an external storage device). The process 400 may be achieved when the programs or the instructions are performed. The process 400 may include following operations.

In operation 410, motion information of a target object between the first state and the second state of the target object may be determined based on the first image and the second image.

The motion information may include a motion field of the target object under the first state represented in the first image and under the second state represented in the second image.

In some embodiments, the motion field may be determined by registering an image A of the target object at the first state (e.g., a resting state of the heart of a patient, etc.) with an image B of the target object at the second state (e.g., a stress of stimulated state of the heart of the patient, etc.). The image registration may be performed based on a registration algorithm. Exemplary registration algorithms may include MAD (Mean Absolute Differences) algorithm, SAD (Sum of Absolute Differences) algorithm, SSD (Sum of Squared Differences) algorithm, NCC (Normalized Cross Correlation) algorithm, SSDA (Sequential Similarity Detection Algorithm), HOG (Histogram of Oriented Gradients) algorithm, BRISK (Binary Robust Invariant Scalable Keypoints) algorithm, or the like.

In some embodiments, the motion information during an imaging scan of a target object (e.g., cardiac scan) of a patient may include information of an active motion and information of a passive motion. The active motion may include a body movement of the patient (shaking of the body), a movement of the scanning bed on which the patient is supported during the imaging scan, a movement of the imaging device that performs the imaging scan, or the like, or a combination thereof. The passive motion may include an involuntary movement of one or more organs and/or tissue of the target object under the resting state or the stress or stimulated state.

In some embodiments, the image processing model may be configured to determine the motion information based on a moving target detection algorithm, a frame difference algorithm, a background subtraction algorithm, or the like. The moving target detection algorithm may be configured to detect a changing region in a sequence of images and extract the moving object from the images. The frame difference algorithm may be configured to extract a motion region in an image based on pixel-based time difference between sequences of images (e.g., between the first image and the second image). The background subtraction algorithm may be configured to detection a motion region by comparing two images (e.g., the first image and the second image), in which one of the images is used as a background image (e.g., the first image used as the background image). According to the background subtraction algorithm, a motion region may include pixels (or voxels) whose pixel (or voxel) values change significantly between the two images (e.g., a difference in pixel (voxel) values of two corresponding pixels (voxels) in two images exceeding a threshold); a background region may include pixels (or voxels) whose pixel (or voxel) values change insignificantly between the two images (e.g., a difference in pixel (voxel) values of two corresponding pixels (voxels) in two images being below a threshold). As used herein, two pixels (voxels) in two images are considered corresponding pixels (voxels) if the pixels (voxels) correspond to or represent a same physical point.

In some embodiments, the motion information between the first state and the second state of the target object may be determined based on mutual information that is determined based on the first image corresponding to the first state of the target object and the second image corresponding to the first state of the target object.

In operation 420, the fourth image may be determined based on the motion information and the third image.

In some embodiments, the processing device may determine the fourth image based on the motion information and the third image using the image processing model.

In some embodiments, the fourth image may be determined by processing the motion information and the third image end-to-end in the image processing model if the motion information is determined using the image processing model. As used herein, the end-to-end process indicates that the image processing model may determine and/or output the fourth image based directly on the first image, the second image, and the third image inputted into the image processing model, and the determination of the motion information may be performed as an intermediate operation by the image processing model.

In some embodiments, if the motion information is determined through another manner (e.g., mutual information), the processing device may input the motion information and the third image into the image processing model such that the image processing model may determine and/or output the fourth image.

In some embodiments, the image processing model may obtain the fourth image by correcting or adjusting the third image based on the motion information between the first state of the target object represented in the first image and the second state of the target object represented in the second image.

Figure 5:
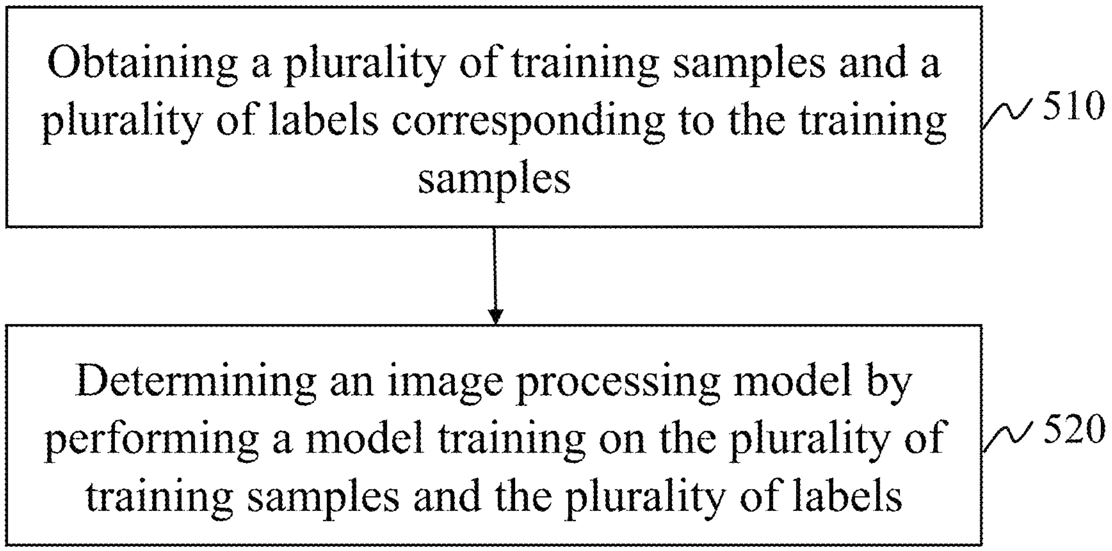
FIG. 5 is an exemplary flowchart illustrating a model training process according to some embodiments of the present disclosure.

FIG. 5 is an exemplary flow chart illustrating a model training process according to some embodiments of the present disclosure. In some embodiments, a process 500 may be performed by a training processing device, such as the processing device 140, a different processing device of the image processing system 100, or a processing device external to the image processing system 100 (e.g., a processing device of a vendor that generates, provides, maintains, and/or updates the model. For example, the process 500 may be stored in a form of programs or instructions in a storage device (e.g., a built-in storage unit of the processing device or an external storage device). The process 500 may be achieved when the programs or the instructions are performed. The process 500 may include following operations.

Figure 6:
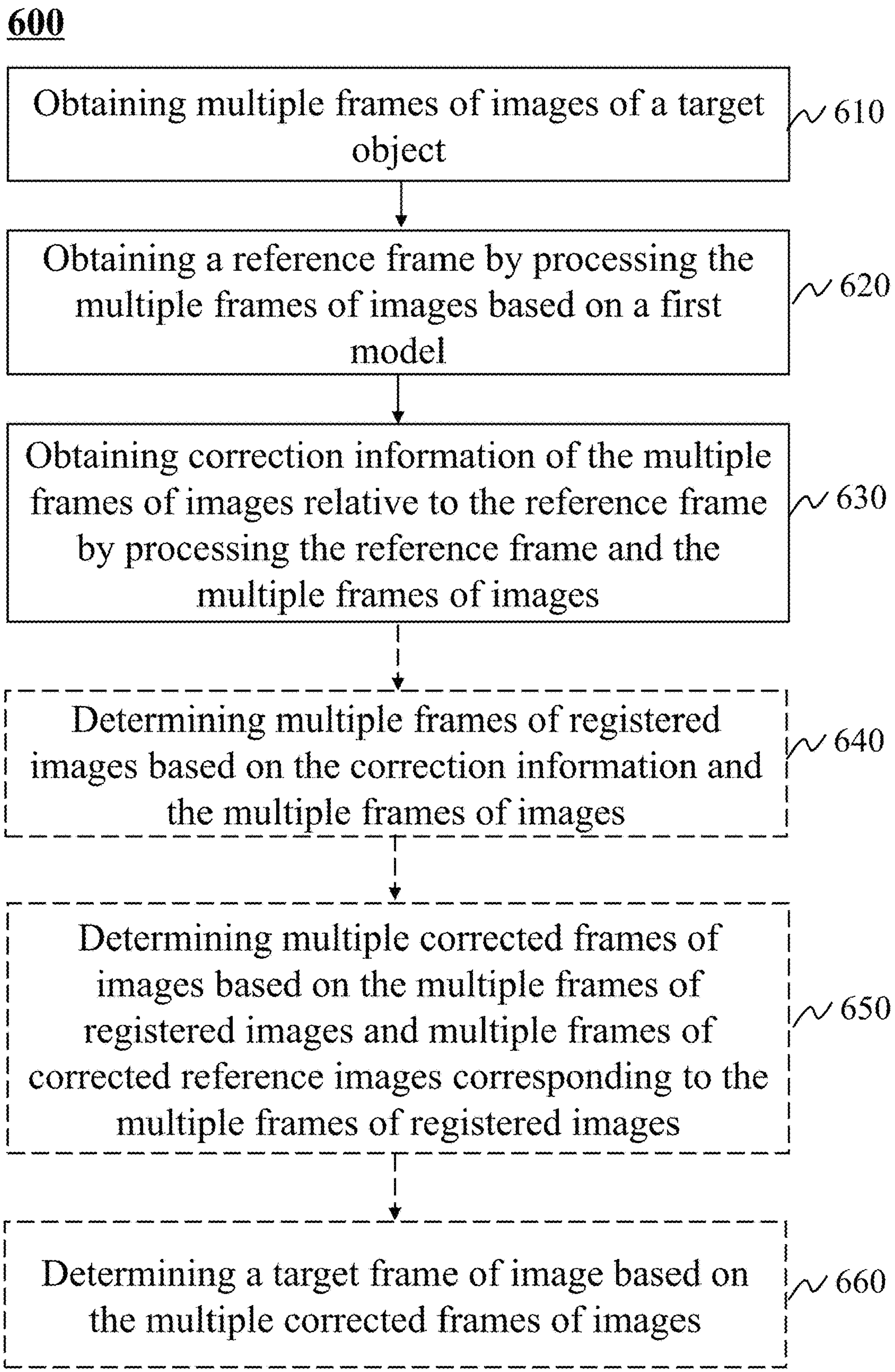
FIG. 6 is an exemplary flowchart illustrating a process for an image processing according to some embodiments of the present disclosure.

In operation 510, a plurality of training sample sets may be obtained. The training sample sets may be selected based on one or more desired functions of the trained model. For instance, the trained model may be the image processing model, the correction model configured to perform attenuation correction of a PET image based on a corresponding CT image as illustrated in FIG. 3 (330 of the process 300), the first model configured to determine, from multiple frames of images of a first modality, a reference frame of the first modality based on a reference image of a second modality as illustrated in FIG. 6 (620 of the process 600), the second model configured to determine motion information of the target object between a first state and a second state of a target object as illustrated in FIGS. 3 and 6 (330 of the process 300, 630 of the process 600), etc. The following descriptions are provided based on the determination of the image processing model for illustration purposes and not intended to be limiting. It is understood that other models described herein may be trained based on the process 500 using suitable training sample sets.

In some embodiments, each of the training sample sets may include a sample first image, a sample second image, and a sample third image, and the label(s) may include a sample fourth image. The sample first image and the sample second image of a training sample set may be images of a sample first modality of a sample target object, and the sample third image and the label(s) of the training sample set may correspond to a sample second modality of the sample target object. The sample first image and the sample third image of the training sample set may correspond to the sample first state of the sample target object, and the sample second image and the label(s) of the training sample set may correspond to the sample second state of the sample target object.

Merely by way of example, the sample first modality may be PET, and the sample second modality may be CT or MRI. One of the sample first state or the sample second state may be a resting state of the sample target object, and the other of the sample first state or the sample second state may be a stress or stimulated state of the sample target object. Correspondingly, the sample first image may be a sample first PET image, the sample second image may be a sample second PET image, the sample third image may be a sample first CT image or a sample first MRI image, and the label(s) may include a sample second CT image or a sample second MRI image. In some embodiments, the label(s) may further include sample motion information between the sample first image and the sample second image.

In some embodiments, at least a portion of the label(s) of the training sample, e.g., the sample second CT image or the sample second MRI image of the training sample may be historical data obtained by scanning the sample target object under the sample second state using an imaging device of the sample second modality. In some embodiments, at least a portion of the label(s), e.g., sample motion information between the sample first state of the sample target object that is represented in the sample first image and the sample second state of the sample target object that is represented in the sample second image may be determined manually or semi-manually. For instance, the sample motion information between the sample first image and the sample second image may be determined based on an outline of the sample target object represented in the sample first image and the sample second image by manual annotation or other manners.

Descriptions regarding the first modality, the second modality, the first state, the second state, the first image, the second image, the third image, and the fourth image elsewhere in the present disclosure (e.g., relevant descriptions of FIGS. 2 and 3) are applicable to the sample first modality, the sample second modality, the sample first state, and the sample second state, the sample first image, the sample second image, the sample third image, and the sample fourth image, respectively, and not repeated here.

In operation 520, the image processing model may be determined by performing a model training using the plurality of training sample sets.

In some embodiments, the training may be performed based on a preliminary image processing model. The preliminary image processing model may include multiple model parameters each of which is assigned an initial value. During the training, the values of the multiple model parameters may be updated iteratively. For instance, in one iteration, at least a portion of a training sample set (e.g., the sample first image, the sample second image, and/or the sample third image) may be input into the preliminary image processing model or an intermediate image processing model (that is partially training using at least one training sample set) obtained in a prior iteration (e.g., an iteration immediately preceding the current iteration) and a prediction result may be determined. The prediction result may include a predicted sample fourth image determined by the preliminary or intermediate image processing model, predicted motion information between the sample first image and the sample second image, or the like, or a combination thereof. The prediction result may be compared with the label(s) of the training sample set.

The training processing device may adjust the values of model parameters of the preliminary or intermediate image processing model based on the comparison of the prediction result with the label(s) of the training sample set. For instance, the training processing device may adjust the values of model parameters of the preliminary or intermediate image processing model based on the comparison of the prediction result with the label(s) of the training sample set to reduce a difference between the prediction result and the label(s) of the training sample set. Merely by way of example, the training processing device may obtain a loss function that relates to the prediction result and the label(s) of a training sample set. The loss function may assess a difference between the prediction result and the label. A value of the loss function may be reduced or minimized (e.g., lower than a threshold) by iteratively adjusting the values of the model parameters.

FIG. 6 is an exemplary flowchart illustrating a process for an image processing according to some embodiments of the present disclosure. In some embodiments, a process 600 may be performed by the processing device, such as the processing device 140. For example, the process 600 may be stored in a form of programs or instructions in a storage device (e.g., a built-in storage unit of the processing device or an external storage device). The process 600 may be achieved when the programs or the instructions are performed. The process 600 may include following operations.

Figure 10:
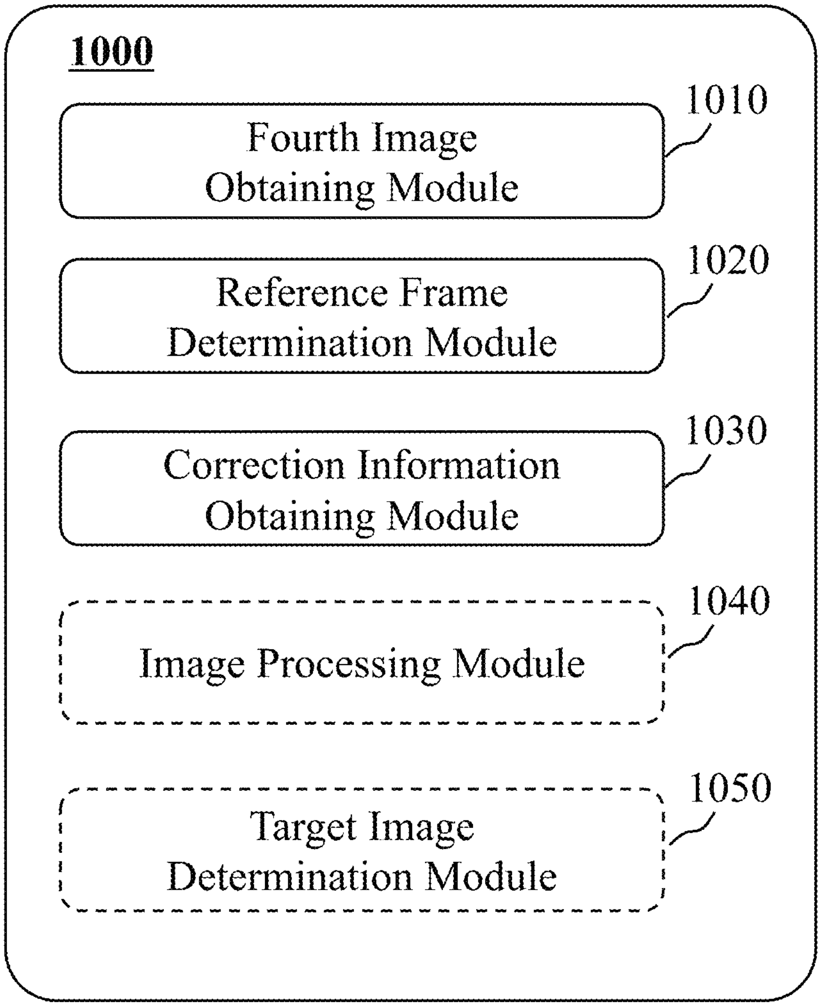
FIG. 10 is an exemplary block diagram illustrating an image processing system according to some embodiments of the present disclosure.

In operation 610, multiple frames of images of a target object may be obtained. In some embodiments, the operation 610 may be performed by the processing device 140 (e.g., a fourth image obtaining module 1010 as illustrated in FIG. 10). The processing device may retrieve the multiple frames of images of the target object from the imaging device, a database, a storage device, or the like.

The multiple frames of images may be images or scan data of the target object. A medical image may be determined based on the scan data using image reconstruction, or the like. For example, the multiple frames of images may include various kinds of scan images, such as PET images, SPECT images, CT images, or the like. In some embodiments, the processing device may obtain the multiple frames of images using an imaging device. For example, the processing device may obtain dynamic PET images or static PET images using a PET imaging device. In some embodiments, the multiple frames of images may be obtained based on PET scan data from one or more PET scans each of which is performed at one scan position. For example, the processing device may obtain multiple groups of PET data by dividing or gating the PET scan data from one PET scan performed at one scan position based on time points when the PET scan data is acquired to, and each group of PET data may be used to generate a frame of PET image. As another example, the multiple frames of images may be obtained by scanning at a plurality of scan positions. For example, the multiple frames of images may include a medical image obtained based on a first PET scan of the target object at a first scan position, a medical image obtained based on a second PET scan of the target object performed at a second scan position, or the like.

In operation 620, a reference frame may be obtained by processing the multiple frames of images based on a first model. In some embodiments, the operation 620 may be performed by the processing device 140 (e.g., a reference frame determination module 1020 as illustrated in FIG. 10).

In some embodiments, the processing device may determine the reference frame by processing the multiple frames of images based on a reference image and the first model. In some embodiments, the reference frame may be selected from the multiple frames of images or multiple processed (e.g., pre-processed) frames of images. In some embodiments, the reference frame may be an image among the multiple frames of images that satisfies a preset condition. The preset condition may include a maximum degree of motion similarity with respect to the reference image, a maximum quality score in terms of one or more image quality dimensions, or a maximum comprehensive score based on the degree of motion similarity and the quality score.

The reference image may be an image of the target object. The reference image may be of a different modality from the multiple frames of images. For example, the multiple frames of images may be PET images, and the reference image may be a CT image.

In some embodiments, the first model may be configured to determine a degree of motion similarity between the reference image and each frame of the multiple frames of images. In some embodiments, the first model may determine the reference frame from the multiple frames of images based on the degrees of motion similarity. For example, the first model may determine an image that has a maximum degree of motion similarity with the reference image, among the multiple frames of images, as the reference frame.

In some embodiments, the processing device may obtain the reference image before, after, or at the same time as obtaining the multiple frames of images. The reference image and the multiple frames of images may each include a representation of at least a portion of the target object. For example, the reference image may include a representation of a first scan region including the target object; the multiple frames of images may each include a representation of a second scan region including the target object; the first scan region may at least partially overlap at least one of the second scan regions. In some embodiments, the processing device may obtain the reference image from an imaging device (e.g., a CT scanner), a storage device, a database, or the like.

In some embodiments, the first model may be a machine learning model. The processing device may input the reference image and the multiple frames of images into the first model, and the first model may determine and/or output the reference frame.

In some embodiments, the first model may be configured to determine the reference frame based on the degree of motion similarity between the reference image and the each frame image of at least some of the multiple frames of images. For example, the first model may determine a position difference between the position(s) of organ(s), or a portion thereof (e.g., the position of an apex of the liver, the position of a bottom of a lung, etc.) in the reference image and the position(s) thereof in the each frame image, and/or a difference between shapes and/or contours of the organ(s) (e.g., shapes and/or contours of the liver, the heart, etc.) in the reference image and the each frame image to determine the degree of motion similarity between the reference image and the each frame image. A frame image that has a maximum degree of motion similarity among the multiple frames of images may be determined as the reference frame.

In some embodiments, the first model may be configured to evaluate at least some of the multiple frames of images in terms of one or more image quality dimensions. The one or more image dimensions may include resolution, Signal-to-Noise Ratio (SNR), contrast, or the like, or a combination thereof. The processing device may input the multiple frames of images into the first model, and the first model may determine and/or output the one or more image quality dimensions. For example, the first model may determine that the resolution of a frame image is excellent, the SNR is high, the contrast is good, or the like, assign a sub-score to each of the one or more image quality dimensions, and determine a quality score based on the one or more sub-scores by way of, e.g., summation, weighted summation (e.g., different sub-scores corresponding to different image quality dimensions being assigned with different weighting factors).

In some embodiments, the first model may be configured to determine, among the multiple frames of images, an image that has a maximum quality score in terms of the one or more image quality dimensions as the reference frame. For example, an image that has a maximum quality score in terms of one image quality dimension or in terms of a plurality of image quality dimensions among the multiple frames of images may be determined as the reference frame.

In some embodiments, the first model may be configured to evaluate at least some of the multiple frames of images in terms of a degree of motion similarity with respect to the reference image in combination with one or more image quality dimensions and determine a comprehensive score. For example, the degree of motion similarity and the quality score in terms of the one or more image quality dimensions of a frame of the multiple frames of images may be summed (e.g., by way of weighted summation) to provide a comprehensive score of the frame. The processing device may determine an image that has a maximum comprehensive score among the multiple frames of images as the reference frame.

More details about the first model may be found elsewhere in the present disclosure. See, e.g., FIG. 7 and the description thereof.

In operation 630, correction information of the multiple frames of images relative to the reference frame may be obtained. In some embodiments, the operation 630 may be performed by the processing device 140 (e.g., a correction information obtaining module 1030 as illustrated in FIG. 10).

In some embodiments, the correction information may include information for correcting the multiple frames of images or for registering the multiple frames of images with the reference frame. For example, the correction information may include registration information, pixel value information of pixels (or voxels) of a frame that represent the target object, or a vicinity thereof, information of a change of the target object, or a vicinity thereof (e.g., a change in the shape of the liver, etc.), or the like.

In some embodiments, the processing device may obtain the correction information by processing the reference frame and the multiple frames of images based on a target object detection algorithm, a frame difference algorithm, a background subtraction algorithm, or the like, or a combination thereof, as described elsewhere in the present disclosure.

In some embodiments, the processing device may obtain the correction information of the multiple frames of images relative to the reference frame by processing the reference frame and the multiple frames of images based on a second model. The second model may be a trained machine learning model. More details about the second model may be found elsewhere in the present disclosure. See, e.g., FIG. 9 and the description thereof.

In some embodiments, the first model and the second model may be two machine learning models independent from each other, or a machine learning model integrating functions of the first model and the second model.

In some embodiments, the second model may determine a deformation field of one frame of the multiple frames of images relative to the reference frame. The deformation field of a frame may include a displacement vector of pixels (or voxels) in the frame with respect to the reference frame. In some embodiments, the deformation field may be determined based on the difference between each pixel (or voxel) in the frame and a corresponding pixel (or voxel) in the reference frame. For example, the second model may obtain a distance and a motion direction of a pixel (or voxel) in the frame with respect to a corresponding pixel (or voxel) in the reference frame. It is understood that a distance and a motion direction of a pixel (or voxel) in an image (e.g., a frame of the multiple frames of images, the reference frame) represents or describes a motion of a physical point (e.g., a physical point of the target object, or a vicinity thereof)

represented by the pixel (voxel) in the image. The correction information may include multiple deformation fields each of which may correspond to a frame of the multiple frames of images.

The processing device may determine the correction information based on the deformation field. In some embodiments, the processing device may determine the deformation fields as the correction information. In some embodiments, the processing device may obtain the correction information by processing the deformation fields. For example, the processing device may merely extract corresponding information of the pixels (voxels) whose values are not zero in a deformation field as part of the correction information.

In operation 640, multiple frames of registered images may be determined based on the correction information and the multiple frames of images. In some embodiments, the operation 640 may be performed by the processing device 140 (e.g., an image processing module 1040 as illustrated in FIG. 10).

In some embodiments, the processing device may process pixels (voxels) in a frame image based on relevant correction information (e.g., the deformation field of the frame). For example, the processing device may adjust position information and/or motion information of the pixels (voxels) in each frame image of the multiple frames of images based on the deformation field of the frame to obtain the multiple frames of registered images, and each of the multiple frames of registered images may correspond to one of the multiple frames of images.

In some embodiments, the correction information may be presented in another form different from the deformation fields. For the correction information presented in a specific form, the processing device may perform the correction information based on a suitable manner to obtain the multiple frames of registered images.

In operation 650, multiple corrected frames of images may be determined based on the multiple frames of registered images and multiple frames of corrected reference images corresponding to the multiple frames of registered images. In some embodiments, the operation 650 may be performed by a target image determination module 1050.

A corrected frame of image may be a corrected image or a registered image. In some embodiments, the corrected frame of image may be an image obtained by performing the attenuation correction on the registered image based on the corrected reference image corresponding to the registered image.

A corrected reference image may be an image that is motion corrected and/or attenuation corrected. In some embodiments, motion states of the target object represented in the multiple corrected reference images may correspond to (e.g., (substantially) the same as) the motion states of the target object represented in the multiple frames of images. As used herein, substantially, when used to qualify a feature (e.g., equivalent to, the same as, etc.), indicates that the deviation from the feature is below a threshold, e.g., 30%, 25%, 20%, 15%, 10%, 5%, etc. For example, a motion state of the target object represented in a frame image (or referred to as a motion state of the frame image for brevity) of the multiple frames of images may correspond to a motion state of a corresponding corrected reference image of the multiple corrected reference images. In some embodiments, the multiple frames of registered images may be obtained by registering multiple frames of CT images that correspond to the multiple frames of images, respectively, with the reference frame. In some embodiments, a count of the multiple corrected reference images may be equal to a count of the multiple frames of registered images, and each of the multiple corrected reference images may correspond to one of the multiple frames of registered images. In some embodiments, the processing device may perform the attenuation correction on each of the multiple frames of registered images based on a corresponding corrected reference image to obtain the multiple corrected frames of images.

For example, a registered image may be a registered PET image, and a corresponding corrected reference image may be a CT image. The processing device may obtain a corrected frame of image by performing attenuation correction on the registered PET image based on the CT image. In some embodiments, the corrected frame of image may be in the form of image data. More details about the acquisition of the corrected frame of image may be found elsewhere in the present disclosure. See, e.g., FIG. 3 and the description thereof (e.g., 330 and relevant description thereof).

In some embodiments, the processing device may determine a corrected reference image based on one of the multiple deformation fields and the reference image. Each of the multiple corrected reference images may correspond to one of the multiple frames of images.

In some embodiments, the processing device may determine the corrected frame of image by correcting each of the multiple frames of images based on a corresponding corrected reference image of the multiple corrected reference images.

In operation 660, a target frame of image may be determined based on the multiple corrected frames of images. In some embodiments, the operation 660 may be performed by a target image determination module 1050.

A target frame of image may be an image displayed to a user. The user may perform subsequent image processing on the target frame of image to obtain image information or information relating to the target object. The subsequent image processing may include image analysis, image rotation, or the like. In some embodiments, the target frame of image may be an image obtained by superposing the multiple corrected frames of images. Each of the multiple corrected frames of images may correspond to one of the multiple frames of images.

In some embodiments, the superposition of the multiple corrected frames of images may include accumulating a corresponding part of the each of the multiple corrected frames of images. For example, a processing device (e.g., the processing device 140) may determine a superposition region of the each of the multiple corrected frames of images. The superposition region of the each of the multiple corrected frames of images may be of a same size. The processing device (e.g., the processing device 140) may further determine a superposition pixel value of each pixel in the superposition region of the each of the multiple corrected frames of images, and obtain the target frame of image based on superposition pixel values of pixels in the superposition regions. In some embodiments, the superposition of the multiple corrected frames of images may include other feasible manners, which is not limited herein.

It should be noted that, in some embodiments, an execution order of the operation 640 and the operation 650 may be adjusted.

In some embodiments, multiple corrected frames of images may be determined based on the multiple frames of images and the multiple frames of corrected reference images corresponding to the multiple frames of images. In some embodiments, a count of the multiple corrected reference images may be equal to a count of the multiple frames of images, and each of the multiple corrected reference images may correspond to one of the multiple frames of images. In some embodiments, the corrected frame of image may be an image obtained by performing the attenuation correction on the frame of image based on the corrected reference image corresponding to the frame of image.

In some embodiments, multiple frames of registered images may be determined based on the correction information, the multiple corrected frames of images, and the reference frame. In some embodiments, the processing device may determine a frame of registered image by correcting each of the multiple corrected frames of images based on a corresponding deformation fields of the multiple deformation fields and the reference frame.

In some embodiments, a target frame of image may be determined based on the multiple frames of registered images. In some embodiments, the target frame of image may be an image obtained by superposing the multiple frames of registered images.

It should be noted that, in some embodiments, the operation 640, the operation 650, and the operation 660 may be omitted.

In some embodiments, the processing device may process (e.g., image reconstruction, etc.) corrected frames of images to obtain one or more static PET images or dynamic PET images.

In some embodiments, dynamic PET images may include PET images obtained at a plurality of time points. Intervals between two adjacent time points of the plurality of time points may be equal or unequal. In some embodiments, the intervals between the two adjacent time points of the plurality of time points may be determined manually or at least semi-automatically. For instance, the intervals between the two adjacent time points may be determined manually by a user, or automatically by a machine without user intervention, or semi-automatically (e.g., determining the intervals based on a condition specified by a user or after a user confirmation of intervals determined by the machine).

In some embodiments, a static PET image may be determined based on a plurality of PET images during a time period. The time period may be determined manually or at least semi-automatically. For instance, the time period may be determined manually by a user, or automatically by a machine without user intervention, or semi-automatically (e.g., determining the time period based on a condition specified by a user or after a user confirmation of time period determined by the machine). For example, a static PET image may be determined by performing a statistical averaging on the plurality of PET images during the time period. In some embodiments, a static PET image may be determined through other feasible manners, which is not limited herein.

In some embodiments, the reference frame and the correction information may be obtained by using the second model that is a machine learning model, thereby improving the efficiency and/or the accuracy of identifying the reference frame and the correction processing.

Figure 7:
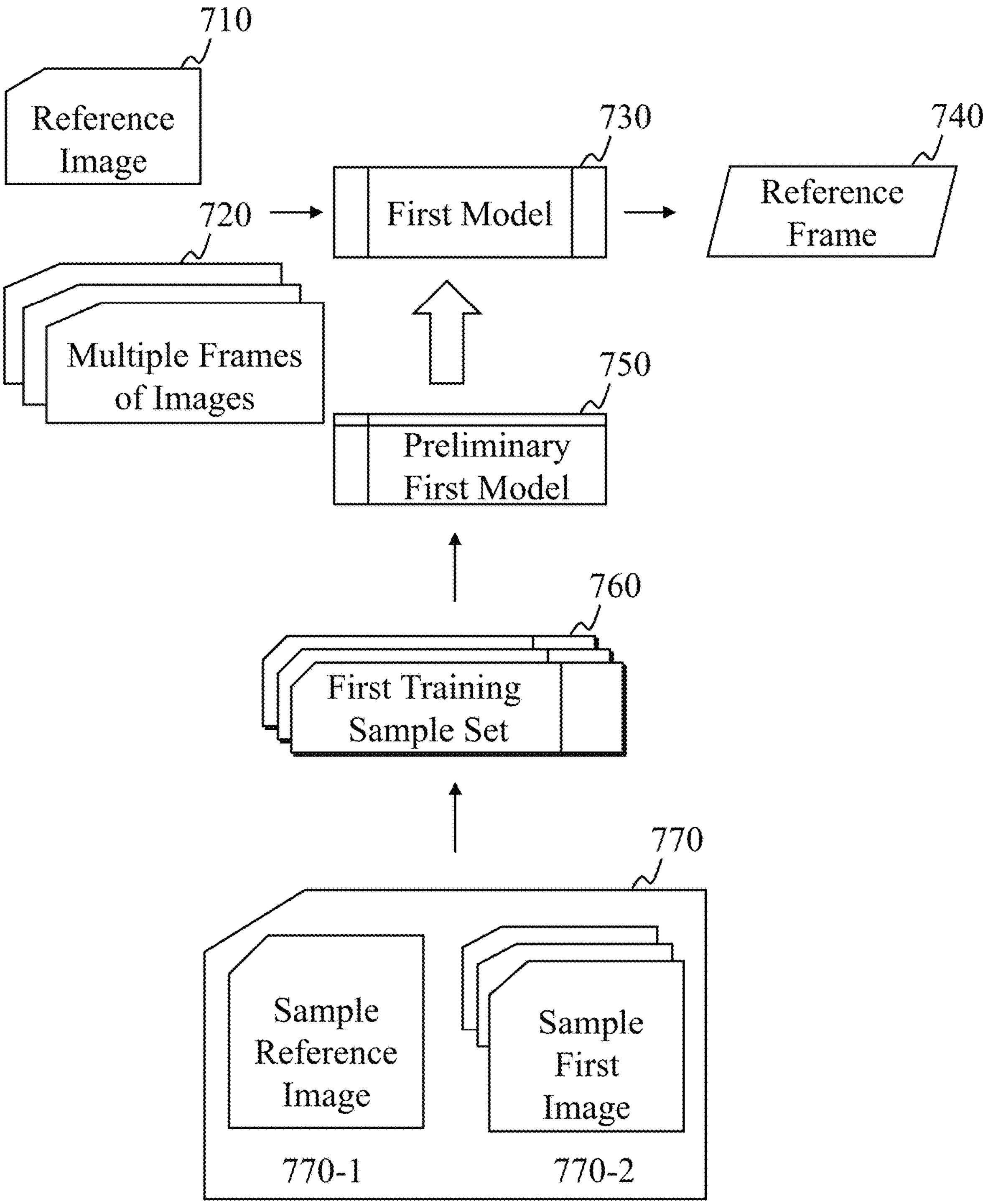
FIG. 7 is a schematic diagram illustrating an exemplary training and functions of a first model according to some embodiments of the present disclosure.

FIG. 7 is a schematic diagram illustrating an exemplary training and functions of a first model according to some embodiments of the present disclosure.

As shown in FIG. 7, a reference image 710 and multiple frames of images 720 may be inputted into a first model 730. The first model 730 may be configured to determine and/or output a reference frame 740. That is, the first model 730 may be configured to select the reference frame 740 from the multiple frames of images 720. More details about the reference image, the multiple frames of images, and the reference frame may be found elsewhere in the present disclosure. See, e.g., FIG. 3, FIG. 4, FIG. 6, and the description thereof.

In some embodiments, the first model 730 may be obtained from one or more components of an image processing system or an external source via the network 120. For example, the first model 730 may be trained by a training processing device (e.g., the processing device 140, a different processing device of the image processing system 100, or a processing device external to the image processing system 100, etc.) in advance and stored in a server. In some embodiments, the first model 730 may be generated based on a machine learning algorithm. The machine learning algorithm may include an artificial neural network algorithm, a deep learning algorithm, or the like, which is not limited herein.

In some embodiments, the first model may be a neural network that includes different layers. The multiple frames of images and the reference image may be processed based on the first model to obtain the degree of similarity between the each frame image and the reference image. For example, the mutual information (e.g., shapes, contours, etc.) of the target object and/or different parts of a patient (e.g., the heart, liver, stomach, etc.) may be identified by the different layers of the first model, and an image that has a maximum degree of similarity (e.g., a degree of motion similarity) among the multiple frames of images with the reference image may be determined. For instance, if the target object includes one organ (e.g., the heart of a patient in a cardiac scan), the degree of similarity between a frame image and the reference image may be assessed based on information of the single organ. As another example, if the target object includes multiple organs (e.g., the heart and the lungs of a patient), the degree of similarity between a frame image and the reference image may be assessed based on comprehensive information of the multiple organs. Merely by way of example, a sub-score may be assigned to a degree of similarity of one of the multiple organs represented in a frame image and also in the reference image, and a degree of similarity of the frame image relative to the reference image may include a summation (e.g., a weighted summation) may be determined based on the sub-scores and used.

In some embodiments, the first model 730 may be obtained by training based on a supervised learning algorithm (e.g., a logistic regression algorithm, etc.). In some embodiments, the first model 730 may be obtained by training a preliminary first model 750 based on a plurality of first training sample sets 760.

A first training sample set 760 may include a sample reference image 770-1 and multiple frames of sample first images 770-2. A label of the first training sample set may include a sample first image that has a maximum sample degree of motion similarity among the multiple frames of sample first images 770-2 with the sample reference image 770-1, a sample first image that has a maximum sample quality score in terms of the one or more sample image quality dimensions among the multiple frames of sample first images 770-2, or a sample image that has a maximum sample comprehensive score based on the sample degree of motion similarity and the sample quality score in terms of the one or more sample image quality dimensions. The sample comprehensive score of the label of the first training sample set may be a weighted summation of the sample degree of motion similarity and the sample quality score in terms of the one or more sample image quality dimensions.

In some embodiments, a sample reference image 770-1 of a first training sample set and the reference image 710 may be of a same modality. For example, the sample reference image 770-1 and the reference image 710 may be CT images. The multiple frames of sample first images 770-2 and the multiple frames of images 720 may be of a same modality. For example, the multiple frames of sample first images 770-2 and the multiple frames of images 720 may be PET images. In some embodiments, the sample reference image 770-1, the reference image 710, the multiple frames of sample first images 770-2, the multiple frames of images 720 may be images of a same target object, such as images of the abdomen of one or more sample patients.

In some embodiments, the label(s) may be determined in various feasible ways, including but not limited to be determined manually, automatically, semi-manually, or the like. In some embodiments, the sample reference image 770-1 and the multiple frames of sample first images 770-2 may be obtained based on historical images (including image data on the basis of which such images are generated). The label(s) may be determined manually or at least semi-automatically. For instance, the label(s) of a first training sample set may be identified manually by a user, or automatically by a machine without user intervention, or semi-automatically (e.g., determining the label(s) based on a condition specified by a user or after a user confirmation of label(s) determined by the machine).

Descriptions regarding the reference image and the first image elsewhere in the present disclosure (e.g., relevant descriptions of FIG. 3) are applicable to the sample reference image 770-1 and the sample first image 770-2, respectively, and not repeated here.

In some embodiments, the preliminary first model 750 may be trained using the first training sample sets in an iterative training process. For instance, the training process may be the same as or similar to that described in 520 of FIG. 5, which is not repeated here.

Figure 8:
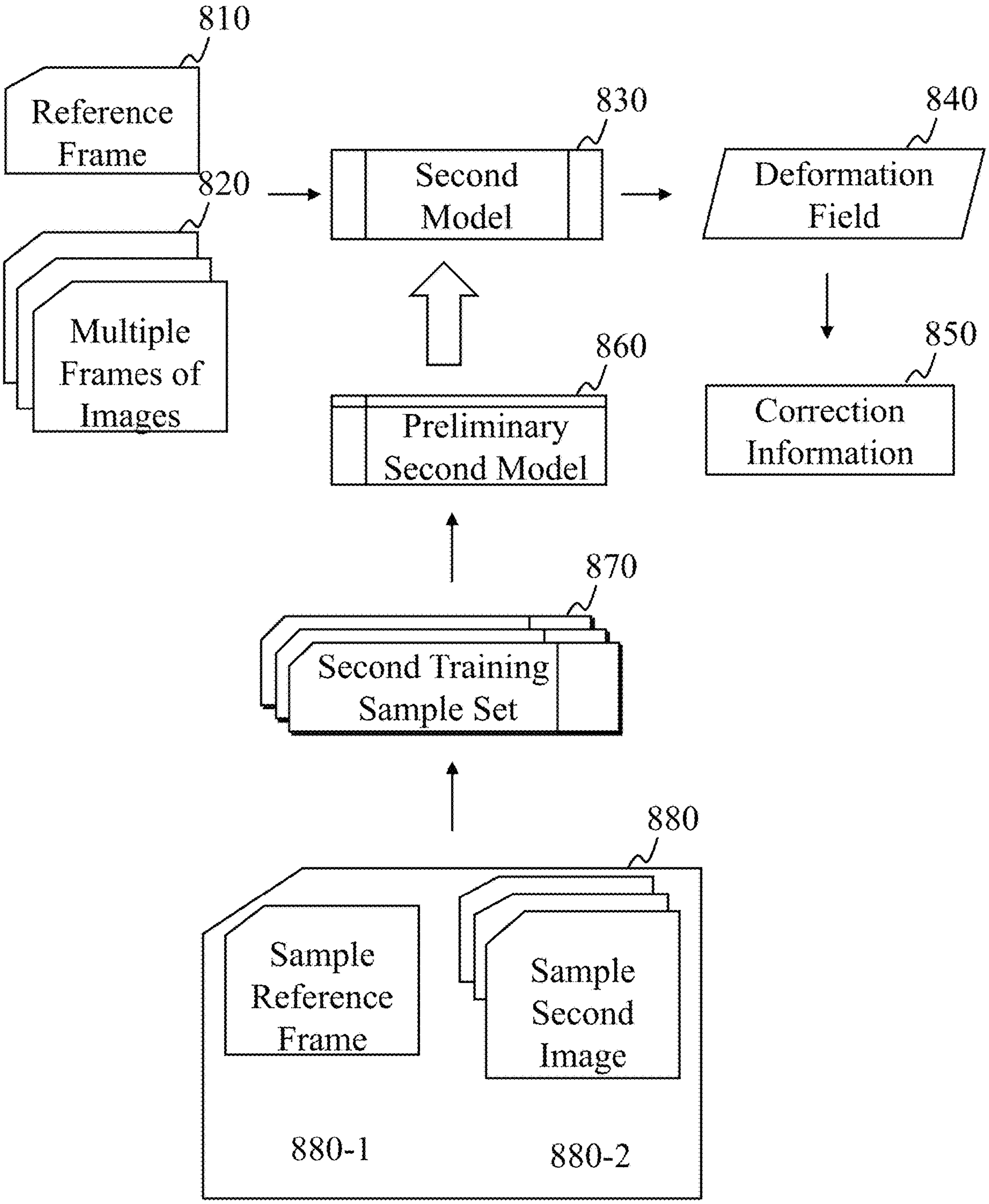
FIG. 8 is a schematic diagram illustrating an exemplary training and functions of a second model according to some embodiments of the present disclosure.

It should be noted that, in some embodiments, the first model 730 may be obtained by training based on a semi-supervised learning algorithm, an unsupervised learning algorithm. FIG. 8 is a schematic diagram illustrating an exemplary training and functions of a second model according to some embodiments of the present disclosure.

As shown in FIG. 8, a reference frame 810 and multiple frames of images 820 corresponding to the reference frame 810 may be inputted into a second model 830, and the second model 830 may be configured to determine and/or output multiple deformation fields 840 corresponding to the multiple frames of images 820 relative to the reference frame 810. In some embodiments, the reference frame 810 may be determined by designating a frame image of the multiple frames of sample second images 820 manually or at least semi-automatically. For instance, a user may designate one of the multiple frames of images 820 as the reference frame 810. As another example, a processing device (e.g., the processing device 140) may designate one of the multiple frames of images 820 as the reference frame 810 automatically with a user intervention, or semi-automatically with some user intervention (e.g., making a selection based on a condition specified by a user or after a user confirmation of a selection made by the processing device). In some embodiments, the processing device may determine correction information 850 based on the multiple deformation fields 840. More details about the reference frame 810, the multiple frames of images 820, and the correction information 850 may be found elsewhere in the present disclosure. See, e.g., FIG. 6 and the description thereof.

In some embodiments, the second model 830 may be obtained from one or more components of an image processing system or an external source via the network 120. For example, the second model 830 may be trained by a training processing device (e.g., the processing device 140, a different processing device of the image processing system 100, or a processing device external to the image processing system 100, etc.) in advance and stored in a server. In some embodiments, the second model 830 may be generated based on a machine learning algorithm based on second training sample sets 880.

A second training sample set 880 may include a sample reference frame 880-1 and at least one sample frame of image (or referred to as a sample second image as illustrated in FIG. 8) 880-2.

In some embodiments, the reference frame 810 and a sample reference frame 880-1 of a second training sample set may be of a same modality, and the multiple frames of images 820 and the multiple frames of sample second images 880-2 of the second training sample set may be of a same modality. In some embodiments, the multiple frames of sample second images 880-2 may be obtained based on historical images (including image data on the basis of which such images are generated).

Descriptions regarding the reference frame and the second image elsewhere in the present disclosure (e.g., relevant descriptions of FIG. 3) are applicable to the sample reference frame 880-1 and the sample second image 880-2, respectively, and not repeated here.

In some embodiments, the second model 830 may be trained based an unsupervised learning algorithm (e.g., K-Means algorithm). In some embodiments, the second model 830 may be obtained by performing unsupervised training on a preliminary second model 860 based on a plurality of second training sample sets 870. A second training sample set 870 may include a sample reference frame 880-1 and multiple frames of sample second images 880-2.

In some embodiments, the preliminary second model 860 include a plurality of model parameters. Each of the plurality of parameters may be assigned one or more initial values before the training of the preliminary second model 860. The values of the model parameters may be updated iteratively during the training. For instance, the training process may be the same as or similar to that described in 520 of FIG. 5, which is not repeated here.

In some embodiments, the second model 830 may be trained based on an unsupervised learning algorithm, which does not need label data in the second training sample sets, thereby reducing the cost (including, e.g., time, computing resources) for acquiring the label data and/or simplifying the training process.

It should be noted that, in some embodiments, the second model 830 may be obtained by training based on a supervised learning algorithm and a semi-supervised learning algorithm.

Figure 9:
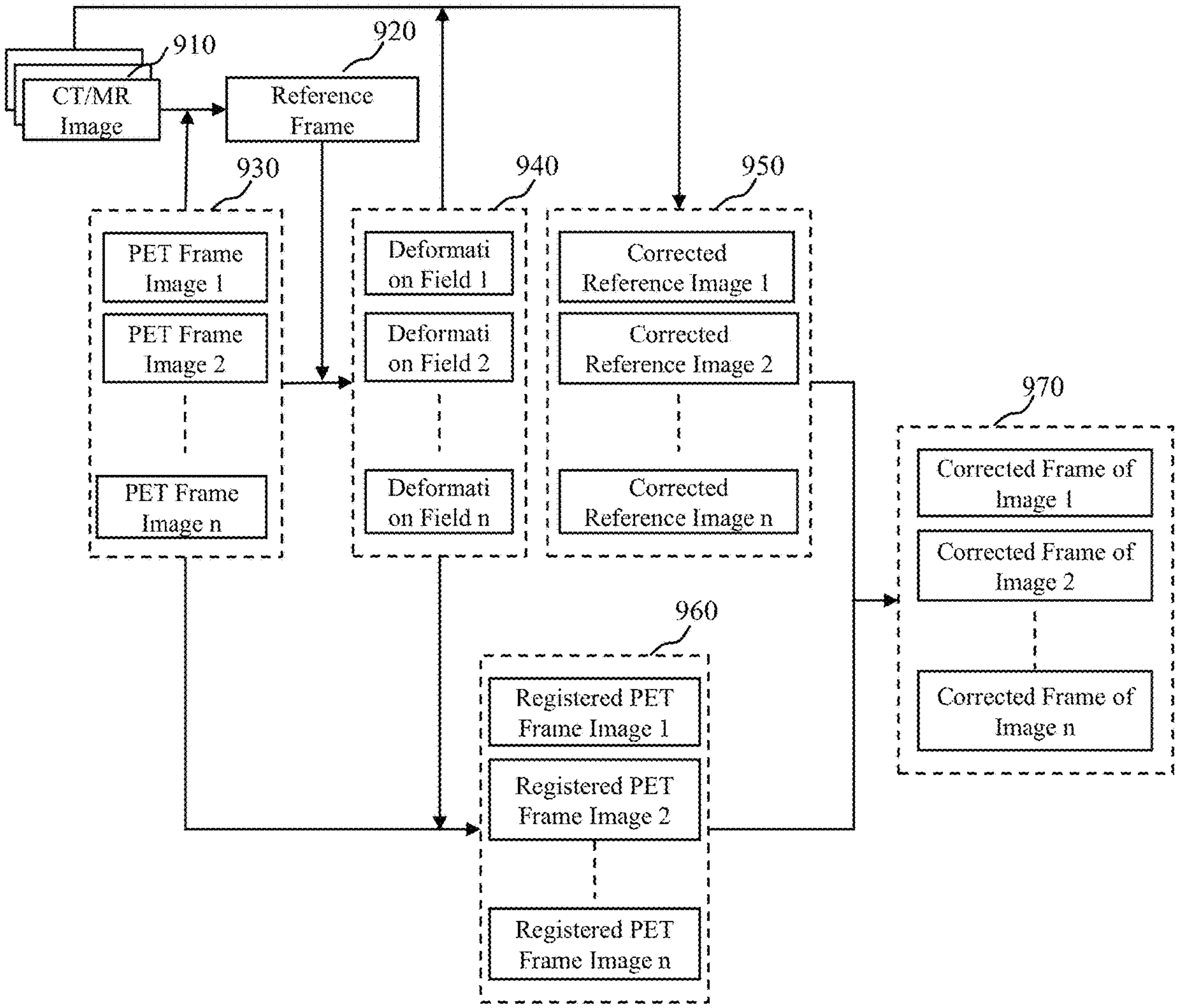
FIG. 9 is a schematic diagram illustrating a process for a medical image processing according to some embodiments of the present disclosure.

FIG. 9 is a schematic diagram illustrating a process for an image processing according to some embodiments of the present disclosure.

As shown in FIG. 9, in some embodiments, a reference image may be a CT/MR image 910. For instance, the processing device may obtain a plurality of CT/MR images 910 and a plurality of PET frame images 930, and determine the reference image based on the CT/MR images 910. For example, the processing device may determine, among the CT/MR images 910, one of the CT/MR images 910 that has the highest resolution, the highest clarity, or a the highest SNR, or a highest comprehensive score that are determined based on more than one image quality dimensions as the reference image.

In some embodiments, the first model as described elsewhere in the present disclosure (e.g., FIG. 7 and the description thereof) may be used to identify a PET frame from the PET frame images 930 including PET Frame Image 1, PET Frame Image 2, . . . , PET Frame Image n, as the reference frame 920 based on a degree of similarity (e.g., a degree of motion similarity) between each of the PET frame images 930 and the reference image 910. For example, the first model may identify, from the PET frame images 930, a PET frame image that has a maximum degree of motion similarity with the reference image 910 as the reference frame 920.

In some embodiments, the second model as described elsewhere in the present disclosure (e.g., FIG. 8 and the description thereof) may be used to determine multiple deformation fields 940 corresponding to the PET frame images 930 relative to the reference frame 920. For example, the processing device may input the PET frame images 930 and the reference frame 920 into the second model to obtain a deformation field 940 for each of the PET frame images 930 relative to the reference frame 920.

In some embodiments, the processing device may obtain registered PET frame images 960 based on the multiple deformation fields 940 and the PET frame images 930. For example, the processing device may obtain one of the registered PET frame images 960 by converting pixels in a PET frame image 930 (e.g., changing the positions of pixels or adjusting values of pixels (voxels) in the PET frame image 930) based on the corresponding deformation field 940 to obtain the registered PET frame image 960.

In some embodiments, to improve the quality of multiple corrected frames of images 970 (e.g., obtaining the multiple corrected frames of images 970 with a higher resolution), the processing device may correct or register the reference image based on the multiple deformation fields 940 to obtain multiple corrected reference images 950 corresponding to the registered PET frame images. A corrected frame of image 970 may be obtained by performing attenuation correction on a registered PET frame image 960 based on a corrected reference image 950 corresponding to the registered PET frame image 960. More description regarding motion correction and/or attenuation correction may be found elsewhere in the present disclosure. See, e.g., FIG. 3 and the description thereof.

FIG. 10 is an exemplary block diagram illustrating an image processing system according to some embodiments of the present disclosure. As shown in FIG. 10, the system 1000 may include the fourth image obtaining module 1010, the reference frame determination module 1020, the correction information obtaining module 1030, the image processing module 1040, and the target image determination module 1050. The system 1000 may be implemented on a processing device (e.g., the processing device 140).

The fourth image obtaining module 1010 may be configured to obtain multiple frames of images of the target object.

The reference frame determination module 1020 may be configured to determine the reference frame by processing the multiple frames of images based on the reference image and the first model.

The correction information obtaining module 1030 may be configured to determine correction information of the multiple frames of images relative to the reference frame by processing the reference frame and the multiple frames of images.

The image processing model 1040 may be configured to determine multiple frames of registered images based on the correction information and the multiple frames of images. The correction information may include motion information.

The target image determination module 1050 may be configured to determine multiple corrected frames of images based on the multiple frames of registered images and multiple corrected reference images, and determine a target frame of image based on the multiple corrected frames of images.

It should be noted that the descriptions of the operations mentioned above may be only for examples and illustrations and do not limit the scope of the present disclosure. For those skilled in the art, various modifications and changes may be made under the guidance of the present disclosure. However, the amendments and changes may be still within the scope of the present disclosure.

The beneficial effects that some embodiments of the present disclosure provides may include: (1) a CT image of a target object may be obtained by simulation using an image processing model as described herein, without the need to performing an actual CT scan, therefore reducing the duration of an imaging process and/or the radiation dose the target object receives during the imaging; (2) the complexity of an image registration may be reduced by using a trained model, and accordingly, the time and/or computing resources needed for performing such an image registration may be reduced than that of traditional non-rigid registration.

It should be noted that different embodiments may have different beneficial effects. In different embodiments, the possible beneficial effects may be any one or a combination of the beneficial effects mentioned above, or any other possible beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier “about”, “approximately”, or “substantially” in some examples. Unless otherwise stated, “about”, “approximately”, or “substantially” indicates that the number is allowed to vary by +20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for image processing, implemented on a computing device having at least one processor and at least one storage device, comprising:

obtaining a first image and a second image of a first modality of a target object, the first image corresponding to a first state of the target object, and the second image corresponding to a second state of the target object;

obtaining a third image of a second modality of the target object, the third image corresponding to the first state of the target object; and determining, based on the first image, the second image, the third image, and an image processing model, a fourth image of the second modality of the target object under the second state.

2. The method of claim 1, further including:

determining a fifth image based on the fourth image and the second image.

3. The method of claim 2, wherein the determining the fifth image based on the fourth image and the second image includes:

obtaining the fifth image by inputting the fourth image and the second image into a correction model, wherein the correction model is a trained machine learning model.

4. The method of claim 1, wherein the first modality includes Positron Emission Computed Tomography (PET), and the second modality includes Computed Tomography (CT) or Magnetic Resonance Imaging (MRI).

5. The method of claim 1, the determining, based on the first image, the second image, the third image, and an image processing model, a fourth image of the second modality of the target object under the second state including:

determining the fourth image by inputting the first image, the second image, and the third image into the image processing model.

6. The method of claim 1, the determining, based on the first image, the second image, the third image, and an image processing model, a fourth image of the second modality of the target object under the second state including:

determining, based on the first image and the second image, motion information of the target object between the first state and the second state; and determining, based on the motion information, the third image, and the image processing model, the fourth image of the second modality of the target object under the second state.

7. The method of claim 6, the determining, based on the first image and the second image, motion information of the target object between the first state and the second state including:

determine the motion information of the target object between the first state and the second state by inputting the first image and the second image into a second model; or determining, based on mutual information between the first image and the second image, the motion information of the target object between the first state and the second state.

8. The method of claim 7, wherein the motion information includes a motion field of the target object under the first state represented in the first image and under the second state represented in the second image, and the motion field is determined by registering the first image with the second image.

9. The method of claim 7, wherein the motion information includes information of an active motion and information of a passive motion, the active motion includes a body movement of a patient, a movement of a scanning bed on which the patient is supported during a imaging scan, a movement of an imaging device that performs the imaging scan, and the passive motion includes an involuntary movement of one or more organs or tissue of the target object under a resting state, a stress state, or a stimulated state.

10. The method of claim 1, wherein the image processing model is a trained machine learning model.

11. The method of claim 1, the obtaining a first image of a first modality of a target object including:

obtaining multiple frames of images of the first modality of the target object;

determining a reference frame by processing the multiple frames of images and a reference image based on a first model, the reference image and the reference frame corresponding to the first state of the target object; and identifying, from the multiple frames of images and based on the reference frame, the first image.

12. The method of claim 11, wherein the reference frame is an image that has a maximum degree of motion similarity with the reference image among the multiple frames of images.

13. The method of claim 11, further including:

determining the first image by performing an attenuation correction using the reference image.

14. The method of claim 11, wherein the first model is further configured to evaluate image quality of the multiple frames of images in terms of one or more image quality dimensions.

15. The method of claim 14, wherein the first model is a trained machine learning model.

16. The method of claim 11, wherein the first modality includes PET or Single-Photon Emission Computed Tomography (SPECT).

17. The method of claim 1, wherein the target object includes a heart of a patient or another type of animal, the first state is a resting state, and the second state is a stress or stimulated state.

18. The method of claim 17, wherein the first image is an image reconstructed based on first data, the first data is data obtained by scanning the target object under the first state using an imaging device in the first modality, and the imaging device in the first modality includes a PET imaging device; and the second image is an image reconstructed based on second data, the second data is data obtained by scanning the target object under the second state using an imaging device in the second modality, and the imaging device in the second modality includes the PET imaging device.

19. A system for image processing, comprising:

at least one storage device storing executable instructions, and at least one processor in communication with the at least one storage device, when executing the executable instructions, causing the system to perform operations including:

obtaining a first image and a second image of a first modality of a target object, the first image corresponding to a first state of the target object, and the second image corresponding to a second state of the target object;

obtaining a third image of a second modality of the target object, the third image corresponding to the first state of the target object; and determining, based on the first image, the second image, the third image, and an image processing model, a fourth image of the second modality of the target object under the second state.

* * * * *